United States Patent
Emigh et al.

(10) Patent No.: US 8,191,138 B1
(45) Date of Patent: May 29, 2012

(54) ADDRESSEE-BASED WHITELISTING

(75) Inventors: Aaron T. Emigh, Incline Village, NV (US); James A. Roskind, Redwood City, CA (US)

(73) Assignee: Radix Holdings, LLC, Incline Village, NV (US)

( * ) Notice: Subject to any disclaimer, the term of this patent is extended or adjusted under 35 U.S.C. 154(b) by 0 days.

(21) Appl. No.: 13/329,320

(22) Filed: Dec. 18, 2011

Related U.S. Application Data

(63) Continuation of application No. 12/970,978, filed on Dec. 17, 2010, now Pat. No. 8,091,129, which is a continuation of application No. 10/995,748, filed on Nov. 22, 2004, now Pat. No. 7,873,996.

(60) Provisional application No. 60/535,421, filed on Jan. 9, 2004, provisional application No. 60/524,107, filed on Nov. 22, 2003.

(51) Int. Cl.
*G08B 23/00* (2006.01)

(52) U.S. Cl. .......................................................... 726/22
(58) Field of Classification Search .................... None
See application file for complete search history.

(56) References Cited

U.S. PATENT DOCUMENTS

| | | | |
|---|---|---|---|
| 2004/0221016 A1* | 11/2004 | Hatch et al. | 709/207 |
| 2005/0033810 A1* | 2/2005 | Malcolm | 709/206 |
| 2005/0080855 A1* | 4/2005 | Murray | 709/206 |

\* cited by examiner

*Primary Examiner* — Brandon Hoffman

(57) ABSTRACT

In some embodiments, techniques for filtering electronic messages may include receiving an email message, determining a non-recipient email addressee associated with the email message, wherein the non-recipient email addressee has an address that is unaffiliated with a recipient for which the email message has been received, determining whether the non-recipient email addressee is associated with a whitelist; and processing the email message preferentially, when it is determined that the non-recipient email addressee is associated with the whitelist.

30 Claims, 21 Drawing Sheets

ADDRESSEE-BASED WHITELISTING

CROSS REFERENCE TO RELATED APPLICATIONS

This application is a continuation of U.S. patent application Ser. No. 12/970,978, now U.S. Pat. No. 8,091,129, entitled Electronic Message Filtering Enhancements, filed Dec. 17, 2010, which is incorporated herein by reference for all purposes, which is a continuation of U.S. patent application Ser. No. 10/995,748, now U.S. Pat. No. 7,873,996, entitled Messaging Enhancements and Anti-Spam, filed Nov. 22, 2004, which is incorporated herein by reference for all purposes, which claims priority to U.S. Provisional Patent Application No. 60/524,107, entitled Additional Messaging Enhancements, filed Nov. 22, 2003, which is incorporated herein by reference for all purposes, and which claims priority to U.S. Provisional Patent Application No. 60/535,421, entitled Implicit Spam Detection, filed Jan. 9, 2004, which is incorporated herein by reference for all purposes.

FIELD OF THE INVENTION

The present invention relates generally to the area of computer software, more specifically to electronic messaging.

BACKGROUND OF THE INVENTION

Electronic communications such as email and instant messages are commonly used for personal and business communications. Unsolicited commercial electronic messages and other unwanted messages can inundate users. Such messages are commonly referred to as spam.

In many cases, measures taken to mitigate the spam problem can end up inadvertently filtering out legitimate email messages. Such messages may be summarily deleted, or routed to a "junk" folder that a user may check infrequently, or not at all. This can cause problems because a user may never see an important message.

It would be useful to have improved techniques for electronic messaging, and for mitigating the adverse effects of spam, and side effects of the countermeasures thereto.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Spam refers herein to any unwanted electronic message, including unsolicited commercial messages, deceptive or fraudulent messages such as phishing messages, and messages with forged information such as false return address. Electronic messages include email, instant messages, SMS text messages (e.g., on cellular telephones), pager messages, RSS messages, Atom messages, Bluetooth messages, and any other suitable electronic messages. For clarity, the present discussion sometimes refers to email messages rather than email messages and/or other types of electronic messages.

Email messages are, however, merely one illustrative type of electronic communication.

Figure 1:
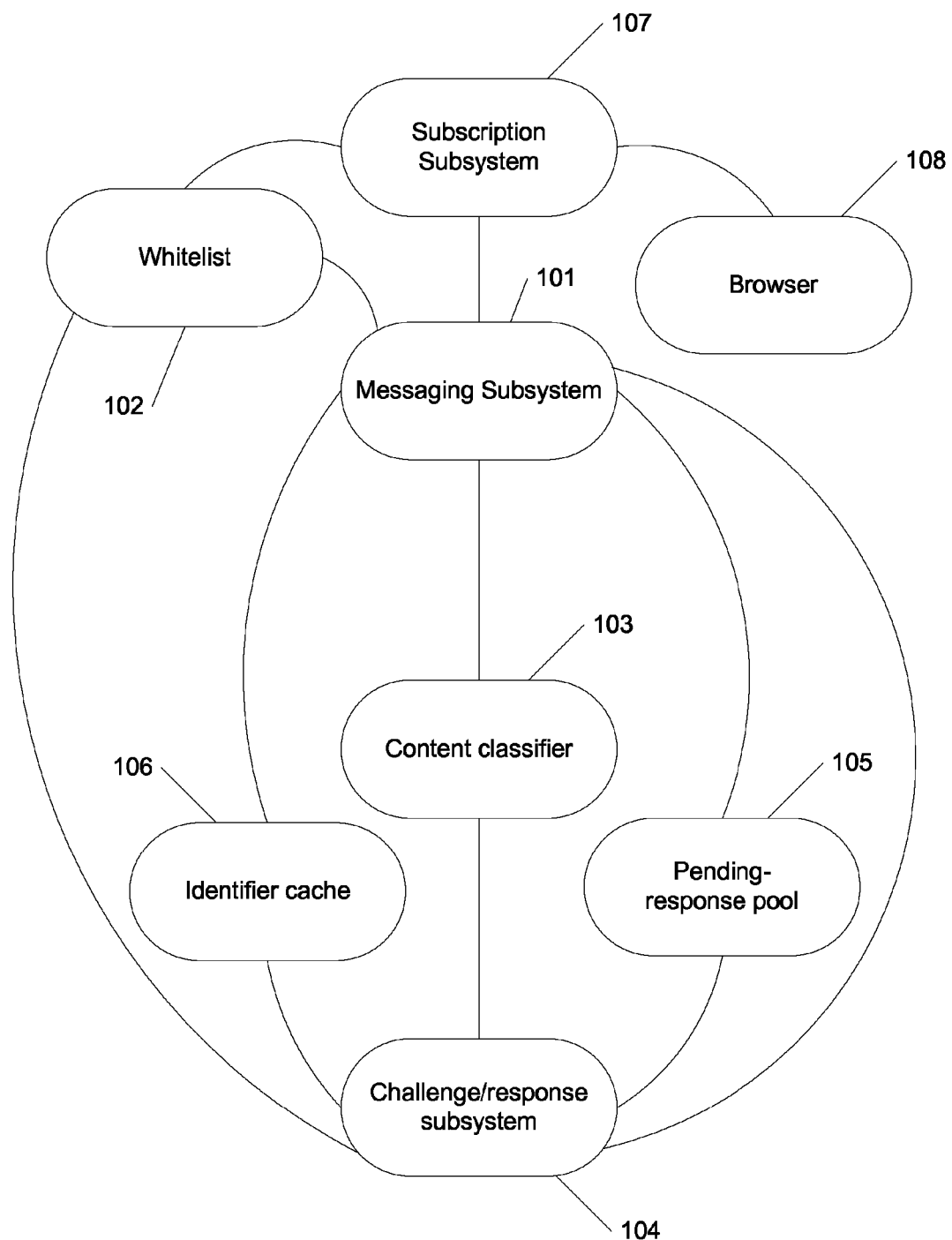
FIG. 1 illustrates possible elements of an anti-spam system, according to some embodiments.

FIG. 1 illustrates possible elements of an anti-spam system, according to some embodiments. In this example, a messaging subsystem 101 processes inbound and outbound messages. Examples of a messaging subsystem include an email client such as Microsoft Outlook, an SMTP server such as a Microsoft Exchange server, or an instant messaging client such as AOL's AIM client. A whitelist component 102 may process and store information relating to classifying messages. A whitelist component 102 may contain a database, such as a list, that records senders that have been identified as sources of messages that may be less likely to be spam. For example, a whitelist component 102 may include a list of senders from which messages may be presumed to be non-spam. In some embodiments, a whitelist component may include a hashed list, such as a privacy enhanced list, as discussed in conjunction with FIGS. 14 and 15. A content classifier 103 may make a probabilistic or binary determination regarding a message's categorization as spam. Examples of a content classifier 103 include a Bayesian filter and a support vector machine. Another example of a content classifier 103 is a system that categorizes challenges, and responses to challenges, as such. Another example of a content classifier 103 is a tentative classifier, which may delay more final determination pending input from a challenge/response subsystem 104.

A challenge/response subsystem 104 may send challenge messages to questionable senders via a messaging subsystem 101. A challenge/response subsystem 104 may process responses to challenges, such as a message that may be categorized as a response by a content classifier 103. A challenge/response subsystem 104 may send responses to received challenges via a messaging subsystem 101. A challenge response system 104 may retrieve and/or store information in a whitelist component 102. For example, after a sender has properly responded to a challenge, a challenge/response subsystem 104 may add the sender to a whitelist 102. A pending-response pool 105 may quarantine or temporarily classify messages from a sender that have been challenged. For example, after a sender has been challenged, and until a proper response may be received or a sufficient time has passed, corresponding message(s) may be held or classified by the pending-response pool 105. An identifier cache 106 may record information about messages sent and received by the messaging subsystem 101. For example, the identifier cache 106 may record that a message is sent, for example by recording a unique identifier associated with a message. In such an example, a message may be an email message, and a unique identifier may be an email message-ID. A challenge/response subsystem 104 may use the identifier cache 106 to verify that a received challenge corresponds to a previously sent message, or that a received response corresponds to a previously sent challenge. A whitelist component 102 or content classifier 103 may use the identifier cache 106 to determine whether a reply message is a reply to an actual message sent by a message recipient.

A subscription subsystem 107 may facilitate desirable receipt of messages from bulk senders and/or services that re-transmit messages, such as a mailing list. A subscription subsystem 107 may update a whitelist 102 to identify desirable senders, or desirable retransmission sources, such as remailers. A subscription subsystem 107 may be updated by a messaging subsystem 101, for example by terminating a subscription. A subscription subsystem 107 may access or modify a list of recipient address and/or account names in the messaging subsystem 107 to validate a subscription request, or create a distinct address for use in a subscription. A browser 108, for example a document reader such as a web browser, may be used to create a subscription to a service. In some embodiments, the browser 108 may notify the subscription subsystem 107 of a subscription request.

Figure 2:
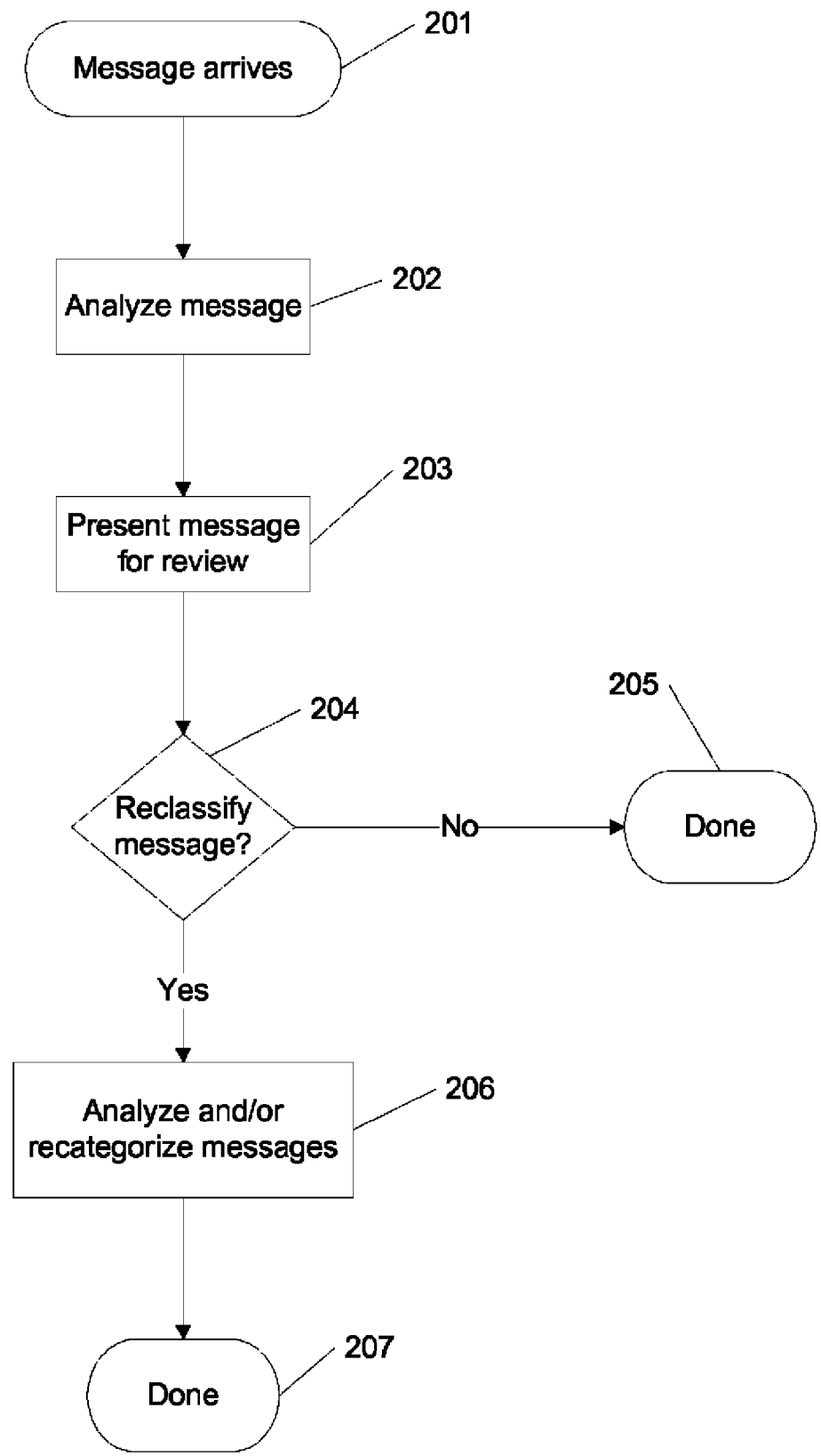
FIG. 2 is a flow diagram of a method for applying a user specified change in spam categorization, according to some embodiments.

FIG. 2 is a flow diagram of a method for applying a user specified change in spam categorization, according to some embodiments. In this example, a message arrives (201). For example, a message such as an email may be received by a messaging subsystem 101 as discussed in conjunction with FIG. 1. A message may be analyzed (202) to determine the likelihood that it may be spam. In some embodiments, a probability may be determined. In some embodiments, a binary determination may be made, for example by applying a threshold to a probability, or by a binary classifier such as a support vector machine. A message may be presented for review (203). An example of presenting a message for review is to present some or all of a message, for example a subject line or message body of a message classified as spam, or as non-spam, or a message unclassified as spam or non-spam. An unclassified message may for example be presented in a sorted list of messages, where the sort criteria may include the likelihood that the message may be spam.

Figure 4:
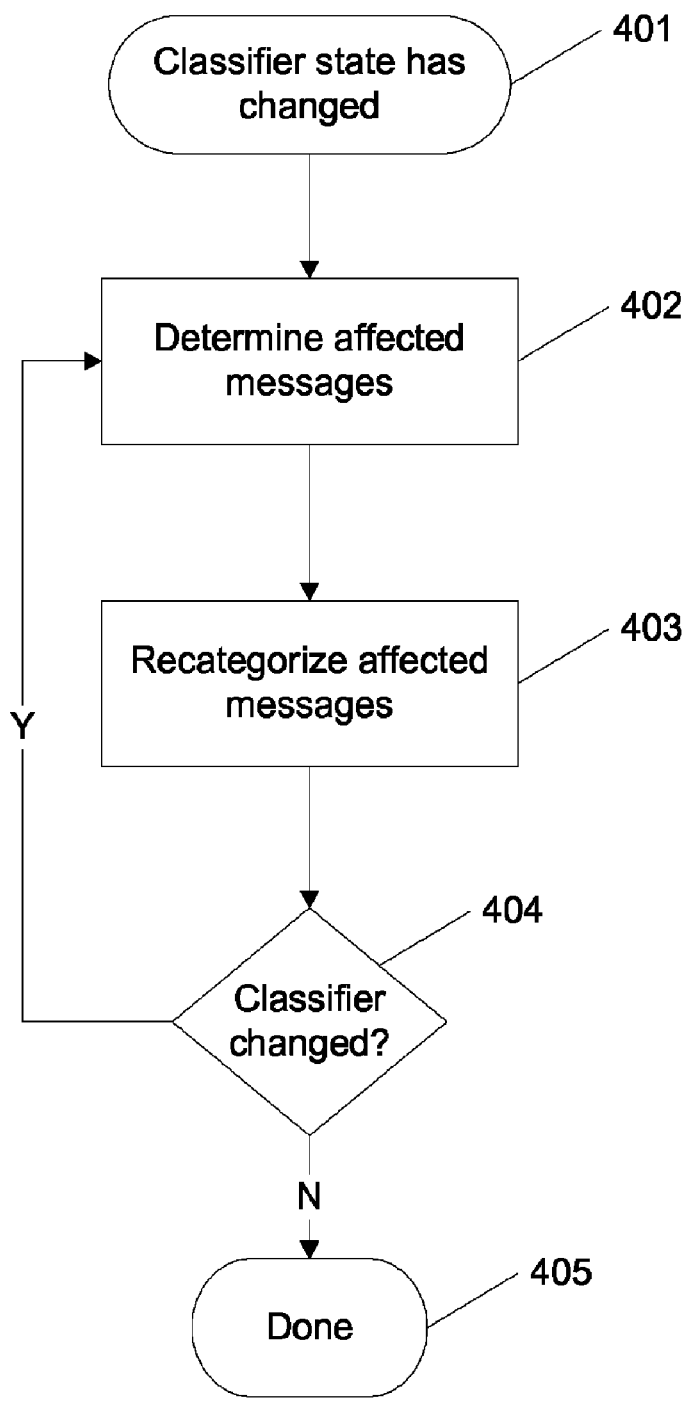
FIG. 4 is a flow diagram of a method for recategorizing messages, according to some embodiments.

A user may recategorize a message (204). One example of recategorizing a message is for a user to specify that a categorized message is incorrectly categorized. Another example of recategorizing a message is for a user to specify that an unclassified message is definitely spam, or definitely not spam. If the user does not reclassify a message (204) then the processing is complete (205) in this example. If the user reclassifies the message (204) then analysis and/or recategorization of other messages, for example as discussed in conjunction with FIG. 4, is performed in this example (206). Processing may be complete (207).

Figure 3:
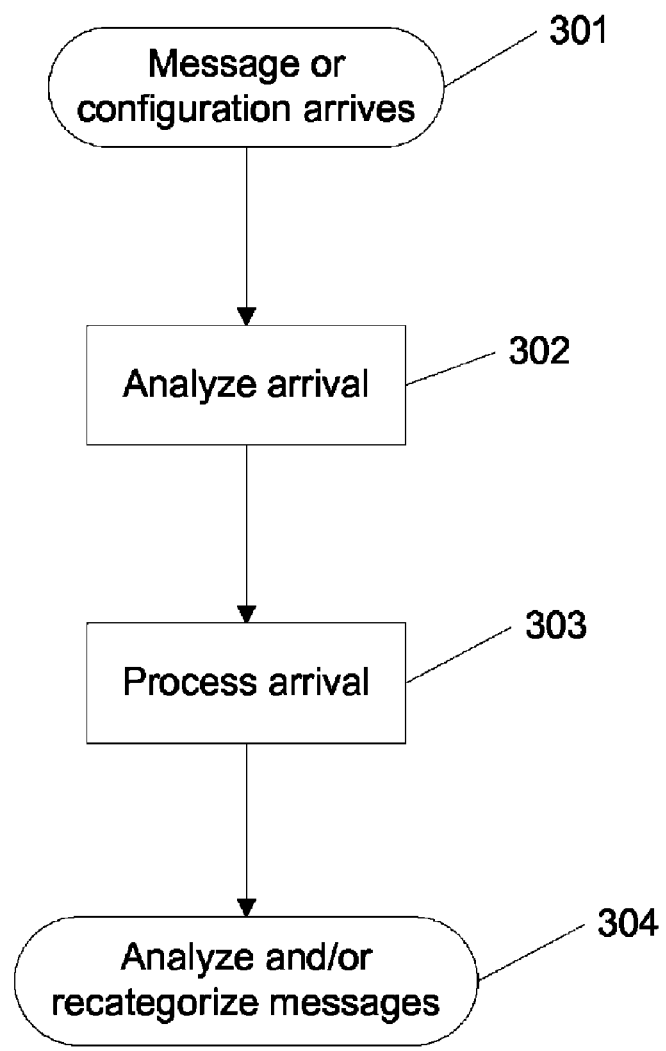
FIG. 3 is a flow diagram of a method for processing a change to a spam classifier, according to some embodiments.

FIG. 3 is a flow diagram of a method for processing a change to a spam classifier, according to some embodiments. In this example, information impacting a spam classifier arrives (301). One example of information impacting a spam classifier is a message such as an email, which may trigger a change to a spam classifier. One example of information in a message that may trigger a change to a spam classifier is a response to a challenge. Another example of information in a message that may trigger a change to a spam classifier is a message containing whitelisting information such as a proof of identity or prepaid electronic postage. Another example of information impacting a spam classifier is configuration data, such as an update to a collaborative filter. The information may be analyzed (302). For example, analysis of a message may include deciding that the message is a response to a challenge. As a second example, analysis of the information may include deciding that the information is an update to a whitelist component 102. A discussion of arrival of list updates, such as whitelists, is provided in conjunction with FIG. 18. As another example, analysis of the information may including deciding that a specific identified message may be decisively categorized as spam (or not spam), and that the message may be used in a training set to update a probabilistic classifier.

The information may be processed (303). An example of processing information includes processing a reply to a challenge, and updating information associated with a sender. Another example of processing information includes updating a whitelist. Another example of processing information includes using a specified message as part of a training set for a probabilistic classifier. Another example of processing information includes the addition or replacement of a whitelist, blacklist, or classifier state such as a phrase list, word list or signature list.

One or more messages affected by a change to a classifier may be analyzed and/or recategorized (304). An example of analyzing and/or recategorizing messages is discussed in conjunction with FIG. 4.

FIG. 4 is a flow diagram of a method for recategorizing messages, according to some embodiments. In this example, state associated with a classifier has changed (401). An example of a change to classifier state is a manual reclassification of a message used as training data, for example as discussed in conjunction with FIG. 2. Another example of a change to classifier state is processing a message that triggers a change to classifier state, such as a response to a challenge, for example as discussed in conjunction with FIG. 3. Another example of a change to classifier state is applying a received change to classifier state such as a whitelist or blacklist, for example as discussed in conjunction with FIG. 3.

One or more affected messages may be determined (402). An example of determining affected messages is to consider all messages to be affected, or all messages with a shared property such as being associated with a message inbox, or not having been displayed to the user, or not having been read or deleted by a user. Another example of determining affected messages is to determine messages whose categorization may have been affected by the changed state. An example of a message whose categorization may have been affected by the changed state is a message that was placed in a message inbox because it was whitelisted by a whitelist entry that has been changed.

Affected messages may be recategorized (403). An example of recategorizing a message is to apply a classifier to the message and assigning it to a category based on the classifier output.

It may be determined if the classifier changed (404). For example, a change in the classifier may include a change in whitelist entries. As another example, a change in the classifier may include a change in the challenge response state. As another example, a change in the classifier may include a change in training sets or internal tables (such as word or phrase lists) for a probabilistic classifier. If there is no change in the classifier (404), then processing is complete (405) in this example. If there is a change in the classifier (404), then affected messages are determined (402) in this example.

Figure 5:
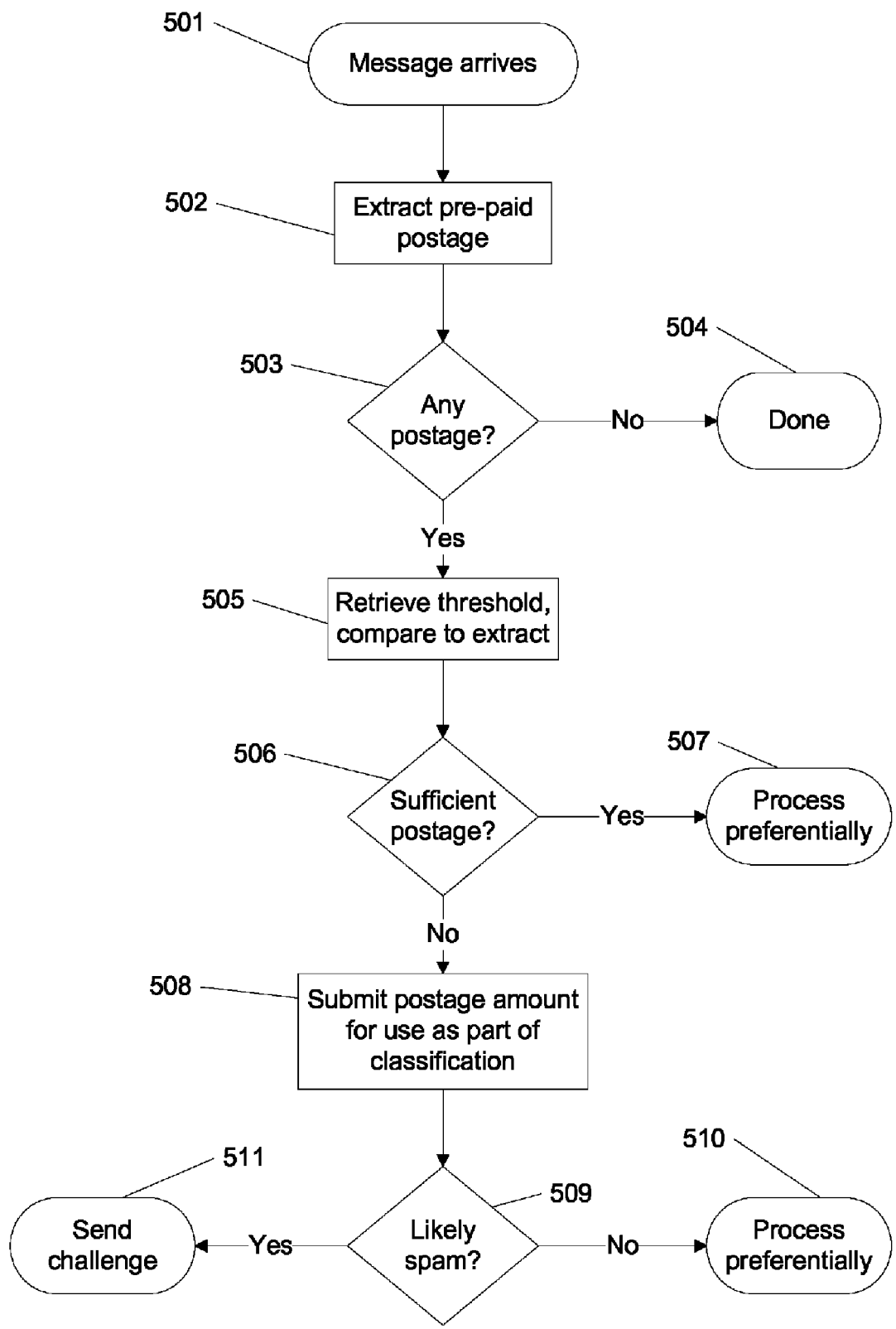
FIG. 5 is a flow diagram of a method for processing electronic postage in a message, according to some embodiments.

FIG. 5 is a flow diagram of a method for processing electronic postage in a message, according to some embodiments. In this example, a message arrives (501). For example, a message such as an email may be received by a messaging subsystem 101 as discussed in conjunction with FIG. 1.

Electronic postage (if any) may be extracted (502). In some embodiments, postage may consist of evidence that a payment of cash or equivalent has been made in advance, for example a cryptographically signed assertion. In some embodiments, postage may consist of evidence that a computation has been performed. In some embodiments, such computation may be related to a corresponding message. For example, computation postage may be embedded in a message, such as an email message, by including a preface, such as a header, that contains the solution to a computational puzzle involving the message. For example, the header of an email message may contain a line such as "X-Postage-MD5-Collision: 20, YYY," in which "YYY" is text that may be appended to the message, sender, recipient and date which will yield an MD5 hash beginning with twenty 1-bits.

A determination of the presence of any postage (503) may be made. For example, if there is no preface or header containing postage (503), then there may be no postage. If there is no postage (503) then processing is complete (504) in this example.

If there is postage (503) then a postage threshold is retrieved and compared to the extracted postage (505) in this example. For example, a threshold may be a specific amount of cash, such as twenty five cents. As another example, a threshold for a computational puzzle, such as an MD5 hash, may be the requirement that approximately one million hashes were performed. Such computational performance may for example be substantially demonstrated by finding a prefix string (the answer to the puzzle) which when hashed with the message results in a hash value with 1-bits in the first twenty one bit positions. In some embodiments, for purposes of comparison (506), if the postage is invalid it may be evaluated as equaling a fixed amount of postage, such as zero postage, or a negative amount of postage.

If the amount of extracted postage exceeds the threshold (506) then the message is preferentially processed (507) in this example. In some embodiments, preferential processing may include categorizing the message as non-spam. In some embodiments, preferential processing may include whitelisting attributes of the message, such as a sender's identity. An illustration of whitelisting attributes of a message will be provided in conjunction with FIG. 6. Examples of preferential processing (510) include delivering a message, and not sending a challenge to a sender of a message.

If the amount of extracted postage does not exceed the threshold (506) then the message is submitted along with the extracted postage amount for classification (508) in this example. For example, classification could utilize a machine learning technology such as a neural network with inputs that include a Bayesian text classifier, and the extracted postage amount. In some embodiments, larger extracted postage amounts may result in lower spam likelihood results. In some embodiments, specific postage amounts, such as amounts common to then current spammers, may result in higher spam likelihood results.

If the result of classification (508) is that a message in not likely to be spam (509), then the message is processed preferentially (510) in this example. In some embodiments, preferential processing may include categorizing the message as non-spam. In some embodiments, preferential processing may include whitelisting attributes of the message, such as a sender's identity. An illustration of whitelisting attributes of a message will be provided in conjunction with FIG. 6. Examples of preferential processing (510) may include delivering a message, and not sending a challenge to a sender of a message.

If message is likely to be spam (509) then a challenge is sent (511) in this example. In some embodiments, sending a challenge (511) may include quarantining the message for a period of time. Sending a challenge (511) may include a request for additional postage. In some embodiments, an amount of additional postage requested may be calculated using the threshold and the extracted postage. An example of using the threshold and the extracted postage is to subtract the extracted postage from the threshold. For example, if twenty cents of postage is extracted and the threshold is twenty five cents, then five cents may be requested. In some embodiment, an additional postage request may be for the threshold amount of postage. For example, if twenty one bits of MD5 hash bits are specified by the threshold, then twenty one bits of MD5 hash bits may be requested in a challenge. In some embodiments, an additional postage request may be for an amount of postage larger than the threshold. For example, if twenty one bits of MD5 hash bits are specified by the threshold, then twenty five bits may be requested in the challenge.

Figure 6:
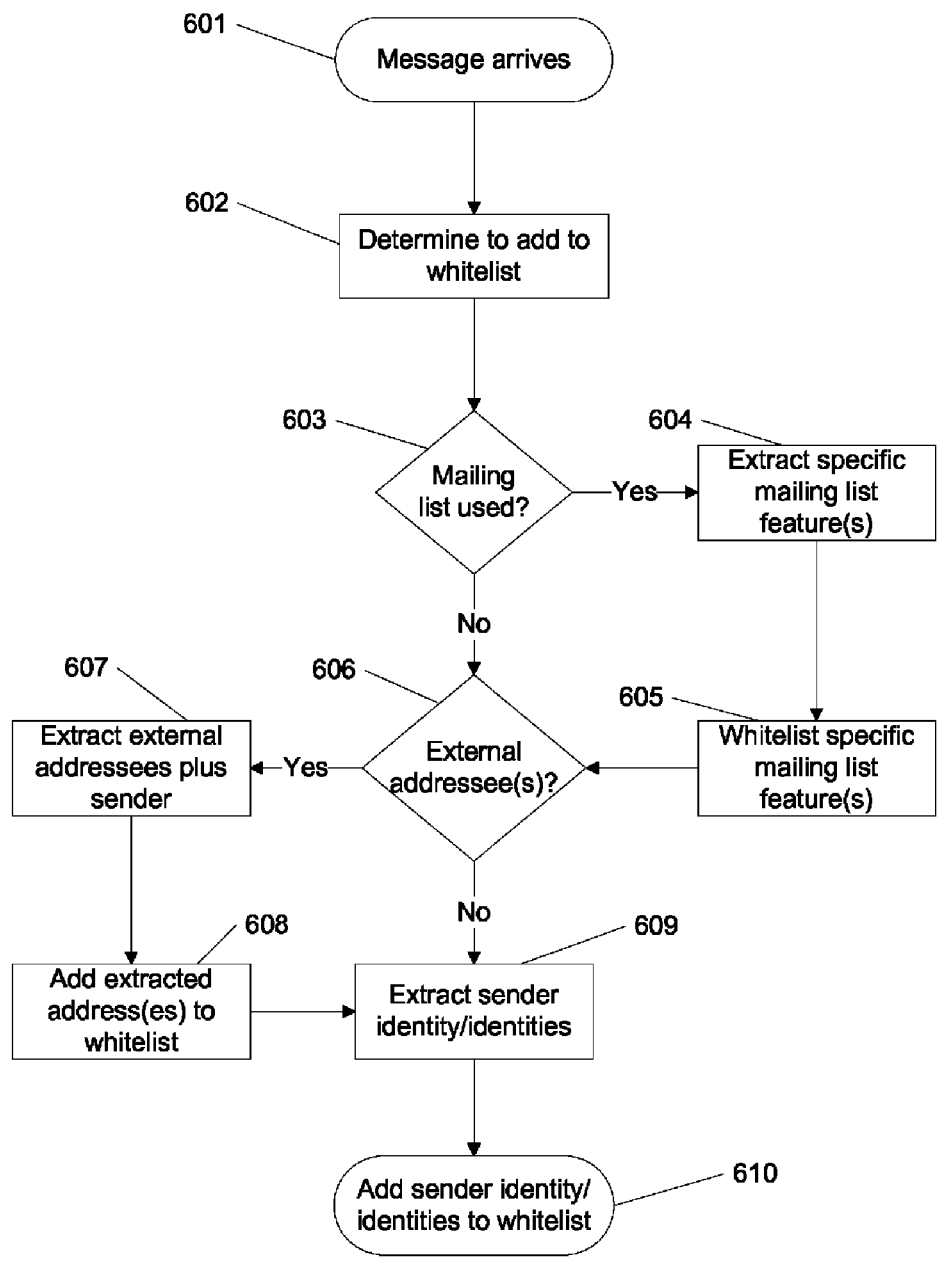
FIG. 6 is a flow diagram of a method for augmenting one or more whitelists, according to some embodiments.

FIG. 6 is a flow diagram of a method for augmenting one or more whitelists, according to some embodiments. In this example, a message arrives (601). For example, a message such as an email may be received by a messaging subsystem 101 as discussed in conjunction with FIG. 1.

A determination to add attributes of a message to a whitelist may be made (602). For example, a determination may be made by a user specifying that a message is not spam, and/or that a message's attribute(s) should be whitelisted. An example of such specification may be election via a user interface, such as a checkbox in a dialog box. As another example, a determination may be made by a challenge response subsystem 104, such as was discussed in conjunction with FIG. 1. For example, a challenge response subsystem 104 may determine, based on receipt of a response message, that a message is not spam, and/or a message's attribute(s) should be whitelisted. As another example, it may be determined that previously received messages, such as messages marked read in an inbox, should have their attributes added to a whitelist. In some embodiments, such a determination may be done automatically, for example as a default part of a program installation or update. In some embodiments, such a determination may be done manually, for example by having a user specify a message folder, such as an email inbox, for such processing.

In some embodiments, determination of preferential treatment of a message may determine that a message attributes should be added to a whitelist (602). For example, messages that receive preferential processing, for example those in FIG. 5 or 7, may be specified to have their attributes added to a whitelist. In another example, a message from a whitelisted sender may be further processed, for example by adding one or more recipients to a whitelist.

In some embodiments, the attributes of a message may be whitelisted. In some embodiments, attributes of one or more related messages may be whitelisted. For example, related messages, such as messages sharing a common sender, or messages with a recipient that is a sender being whitelisted, may have attributes whitelisted after a valid response is received by a challenge/response subsystem.

A message may be examined to see if a mailing list was used (603). Such a test may look for elements in a message indicative of processing by a mailing list. For example, message header lines such as "List-ID," "Mailing-List", "X-Mailing-List" or "List-Unsubscribe" may indicate use of a mailing list. Examples of other indications that a message was processed by a mailing list include a message ID originated from a domain other than that of the sender (for example, the domain of the message addressee), a precedence of "bulk," and the presence of the recipient's domain early in the delivery path. Another example of a feature indicative of a message that was processed a mailing list is a subject line that includes "[listname] subject," in which "listname" may be the name of a mailing list. The presence of a combination of one or more these elements may be considered evidence that a message was processed by a mailing list.

If a mailing list was used (603), then one or more specific mailing list features are extracted (604) in this example. An example of a specific mailing list feature is a message header such as "List-ID" along with text that specifies a name of a mailing list. Another example of a specific mailing list feature is a singular addressee for a message, such as a posting address for a mailing list. Another example of a specific mailing list feature is evidence of an explicit or implicit intermediate addressee. An example of an explicit intermediate addressee is an address such as a mailing list posting or distribution address specified as a message recipient, for example in "To:" or "Cc:" header lines of an email message. An example of an implicit intermediate addressee is an address not explicitly listed as a recipient for a message, but that is evidenced by reviewing other attributes such as routing information. For example, routing information in an email message may include "Received" header lines, which may for example include evidence of an implicit intermediate addressee, such as a domain name associated with a mailing list. Another example of a specific mailing list feature is "[listname]" in the subject line as described earlier. In that example, listname may also be evidence of an implicit intermediate addressee. In some embodiments, the original sender's address may not be part of specific mailing list features that may be extracted.

One or more specific mailing list features may be added to a whitelist (605). A message may be examined to see if there are one or more external addresses (606) among the addressees.

If a mailing list is not used (603), then a test is performed in this example to see if there are one or more external addresses (606) among the addressees. An addressee refers herein to any address that is an apparent recipient of a message. For example, an address on a "To:" line, or a "CC:" line in a received email may be an addressee of that email. An external address refers herein to any address not directly affiliated with the recipient for which a message may be processed. For example, if a message is addressed to ALICE, then processing of that message for BOB would reveal the external addressee ALICE. Processing of the same message for ALICE would reveal that there are no external addressees (relative to ALICE).

In some embodiments, a recipient's address may not be consulted, and the test for external addressees (606) may be positive if there are any addressees found.

If a message has one or more external addressees (606), then addressees plus the sender address are extracted (607) in this example. One example of an external address is an address that relays mail associated with a mailing list. In some embodiments, the sender plus only some or all of the external addressees may be extracted. As a first example, if a message is sent by SENDER, and the addressees included RECIPIENT1 and RECIPIENT2, then processing for RECIPIENT1 to extract external addressees plus sender address would produce a an unordered set of {SENDER, RECIPIENT2}. In some embodiments, the sender plus some or all addressees may be extracted. As a second example, if a message is sent by SENDER, and the addressees included RECIPIENT1 and RECIPIENT2, then processing for RECIPIENT1 to extract all addressees plus sender address would produce an unordered set of {SENDER, RECIPIENT1, RECIPIENT2}.

The extracted set of addresses may be added to a whitelist (608). In some embodiments, individual addresses may be separately added to a whitelist. For example, within the context of the second example given above, RECIPIENT1, SENDER, and/or RECIPIENT2 may be added to a whitelist. In some embodiments, the combined extracted set may be added as a whole to a whitelist. For example, within the context of the second example just provided, the set of {RECIPIENT1, SENDER, RECIPIENT2} may be added as a whole to a whitelist. One or more sender identities may be extracted (609).

If there are no external addressees (606), then one or more sender identities are extracted (609) in this example.

An example of a sender identity is the email address provided in the "From:" field of a message. Another example of a sender identity for an email is the FROM address as contained in the SMTP envelope. Another example of a sender identity is a digital certificate used to sign a message. For example, an email message may be signed using S/MIME and a digital certificate. Another example of a sender identity is a public key, such as a PGP public key, used to verify a digital signature on a message. Another example of a sender identity is a certificate or public key embedded in a message, and attested to as an identity by the message. For example, a message may be signed by an old public key or certificate, and contain a new public key or certificate that the sender may optionally use in the future, such as when the old public key or certificate expires or is revoked. For example, in an email message, a new public key or certificate may be provided in a header labeled "X-New-Signature-Public-Key," and the message including the header line may be signed using an old public key.

Another example of a sender identity is a certificate of authorization. An example of a certificate of authorization is a public key certificate, issued by an entity trusted by the recipient, for example issued by the recipient, by an external authority or by an entity certified by the recipient, for use as evidence in an associated message. Another example of a certificate of authorization is an authorization token, optionally signed by a recipient, for example by including a keyed hash for which the key is known only to a recipient. In some embodiments, a certificate of authorization may be associated with a message by including it with the message. In some embodiments, a certificate of authorization may be associated with a message by signing a message with a corresponding private key. A certificate of authorization may be used to construct one or more related sender identities. An example of a sender identity constructed from a certificate of authorization is an attribute of a certificate of authorization, including for example a name or an issuing authority associated with the certificate. In some embodiments (not shown), the addition of some attributes to a whitelist, such as an issuing authority for a certificate of authorization, may require additional user approval. In some embodiments, validated certificates of authorization are processed. In some embodiments, an invalid certificate of authorization may be ignored. Examples of an invalid certificate include a certificate that has been revoked, a certificate issued by an entity that is not trusted by a recipient, or an expired certificate.

One or more sender identities may be added to a whitelist (610). In some embodiments, additional information may be stored in a whitelist in conjunction with a sender identity, for validation against future messages. For example, a sender's client identifier, such as text following "X-Mailer" in an email header, may be stored in conjunction with a sender's identity. As another example, some or all of the transmission path of a message may be stored in conjunction with a sender's identity. An example of a transmission path for an instant message is an IP address associated with the sender. An example of part of such a transmission path is a subnet associated with the sender, for example the first three octets of a four octet IP address. An example of a transmission path for an email message is a sequence of transporting mail agents, for example as listed in the header of an email. An example of a partial transmission path of an email message is the name of a host that originated the message. In some embodiments, adding a sender identity to a whitelist may include issuing a certificate to the sender, for example sending a certificate of authorization to the sender. In some embodiments, a certificate of authorization may be cryptographically signed.

In some embodiments, whitelists used to hold specific mailing list features, whitelists used to hold sender/recipient addresses, and whitelists used to hold sender addresses may be stored separately. In some embodiments, some or all such whitelists may share a common storage area. As a first example, distinct types of whitelist entries may be distinguished in a common storage area by having a flag field to indicate the type of whitelist entry. As a second example, two or more whitelists, for example represented in databases, may be combined and optionally normalized. In such an example, a query of the combined database for a sender address may return a status of an individual "sender whitelist" entry (if any) and additionally return a list of address sets (external addressees) that contain the sender's address. As a third example, a whitelist used to store extracted addresses and a whitelist used to store extracted identities may be merged, for example without distinguishing between roles (e.g. sender, recipient, etc.).

In some embodiments, a whitelist including a whitelist used to hold specific mailing list features, a whitelist used to hold sender/recipient addresses, or a whitelists used to hold sender addresses, may record hashes of content. An example of a whitelist that records a hash of its content is a privacy enhanced list, as will be described in conjunction with FIGS. 14 and 15. In some embodiments, an addition to a whitelist, including those performed in conjunction with 605, 608, or 610, may involve adding the hash of the content. For example, a hash of an identity may be added to a whitelist instead of an identity.

In some embodiments, whitelists used to hold specific mailing list features, whitelists used to hold recipient address sets, or whitelists used to hold sender addresses may be manually altered. In one example, a user may manually delete entries, such as entries listed in a dialog box list. In another example, a user may manually add entries, for example by entering information into a dialog box. In some embodiments, additions may be made as a consequence of processing a message, for example as described in conjunction with FIG. 6. In some embodiments, deletions may be made as a consequence of processing a message, for example as will be described in conjunction with FIG. 8. In some embodiments, additions may be made programmatically, for example in response to a browser when a user signs up for a mailing list. In some embodiments, some or all programmatic additions to or deletion from whitelists may include user approval.

In some embodiments, mailing list detection may not be used, and all messages may be presumed to have no specific mailing list attributes. In some embodiments, external (recipient) address whitelisting may not be used, and tests in this example for external addresses result in finding none. In some embodiments, individual sender identities may not be added to whitelists, and such an example may be complete with no additional processing.

Figure 7:
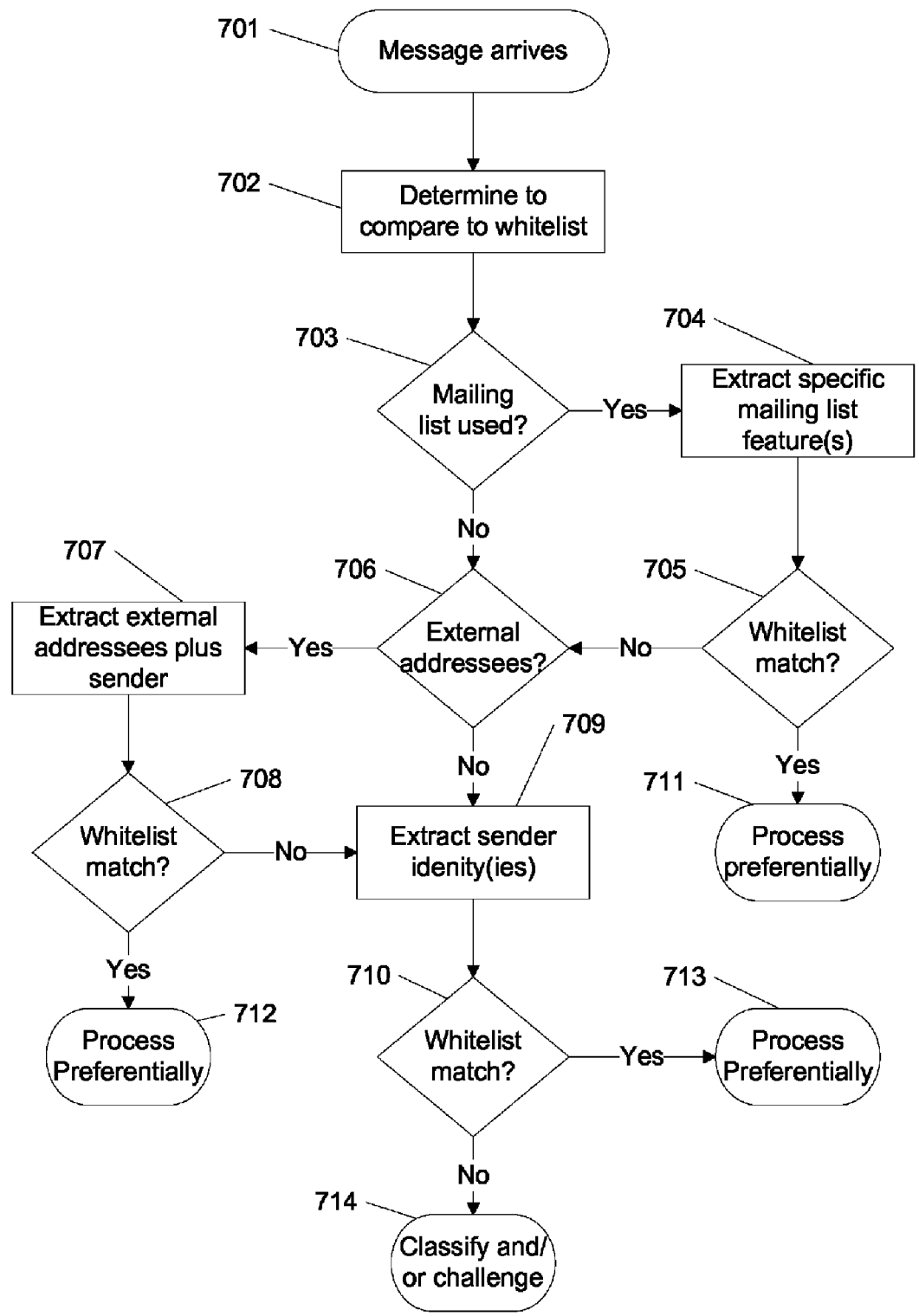
FIG. 7 is a flow diagram of a method for comparing a message with one or more whitelists, according to some embodiments.

FIG. 7 is a flow diagram of a method for comparing a message with one or more whitelists, according to some embodiments. In this example, a message arrives (701). For example, a message such as an email may be received by a messaging subsystem 101 as discussed in conjunction with FIG. 1. A determination to compare one or more attributes of a message to a whitelist may be made (702). For example, it may be determined that the message is not a challenge or a reply, and the message may be categorized, for example as spam or non-spam. In some embodiments, all arriving messages may be matched against a whitelist.

A message may be tested to see if a mailing list was used (703), for example as was discussed above in conjunction with 603 of FIG. 6. If a mailing list was used (703), then specific mailing list feature(s) are extracted (704) in this example. The extraction may, for example, use an approach discussed previously in conjunction with 604 of FIG. 6.

Extracted features may be compared with a whitelist (705). In some embodiments, all extracted features must exist in a whitelist to determine a match. In some embodiments, one or more extracted features must exist in a whitelist to determine a match. If a whitelist match is found (705), then the message is processed preferentially (711) in this example. An example of preferential processing is categorizing a message as non-spam. Another example of preferential processing is providing input relating to the match to a content classifier. If there is no whitelist match (705), or if a mailing list is not used (703), then a test for one or more external addressees (706) is performed in this example.

External addressees may be tested for (706), for example as discussed previously in conjunction with 606 of FIG. 6. If a message has external addressees (706) then addresses for external addressees and sender are extracted (707) in this example. Extraction may, for example, be done as discussed previously in conjunction with 607 of FIG. 6.

A whitelist may be tested for a match (708) with extracted addresses. In some embodiments, a match exists when a fixed number N, such as 1, addresses in the extracted set of addresses are in a whitelist. In some embodiments, a match exists when the extracted set exactly matches a whitelisted set. In some embodiments, a match exists when there are at least a fixed number N, such as 2, addresses in common between the extracted set and a set in a whitelist. In some embodiments, a match exists when at least a percentage, such as 100%, of the addresses in the extracted set are present in a set in the whitelist. In some embodiments, a match exists when there are at least a percentage, such as 100%, of the addresses in a whitelist set that are present in the extracted set. In some embodiments, a match exists when at least some percentage, such as 100%, of the extracted addresses is in one or more sets in one or more whitelists.

If a whitelist match is found (708), then the message is processed preferentially (712) in this example. An example of preferential processing (712) is categorization as non-spam. Another example of preferential processing (712) is adding attributes from a message to a whitelist, for example as was discussed in conjunction with FIG. 6.

If no external identities were found (706), or if no match with a whitelist is found (708), then one or more sender identities are extracted (709) in this example.

Extraction of one or more sender identities may, for example be performed as discussed in conjunction with 609 of FIG. 6. A comparison may be performed between an extracted identity and a whitelist (710). In some embodiments, additional information may be extracted and matched against a whitelist, for example as was discussed earlier in conjunction with 609 of FIG. 6. An example of a match is a matching a sender email address, and optionally matching additional information associated with the sender in the whitelist. In some embodiments, a comparison between an extracted identity and a whitelist may include determining whether a certificate of authorization is signed by an authorized certificate authority, such as the recipient, a delegate of the recipient, or an external authority. In some embodiments, such authorized certificate authorities may be maintained in a whitelist. In some embodiments, a list of revoked certificates may be checked to determine whether a certificate of authorization is no longer valid. If a sender's identity is found in a whitelist (710), then the message is processed preferentially (713) in this example. An example of preferential processing (713) is categorizing a message as non-spam. Another example of preferential processing (712) is adding attributes from a message to a whitelist, for example as was discussed in conjunction with FIG. 6.

If no extracted sender identity is found in a whitelist (710), then the message is further classified and/or challenged (714) in this example. An example of further classification includes processing by a probabilistic text classifier, such as a Bayesian filter. An example of challenging the message includes transmitting a message to the sender that requires an action or response.

In some embodiments, a whitelist such as a whitelist used to hold specific mailing list features, a whitelist used to hold sender/recipient addresses, or a whitelist used to hold sender addresses, may contain hashes of content. An example of a whitelist that records a hash of its content is a privacy enhanced list, as will be described in conjunction with FIGS. 14 and 15. In some embodiments, a test for a match in a whitelist, such as those performed in conjunction with 705, 708, or 710, may involve matching the hash of the content. For example, a hash of an identity may be checked for in a whitelist instead of an identity.

In some embodiments, information about near matches with a whitelist in 705, 708, and 710 may be provided to a classifier. For example, a near match of a sender's identity against a whitelist, as discussed in conjunction with 710, may include a match of a sender's address, but failure to match some or all additional information. As another example, a near match of a sender's identity against a whitelist, as discussed in conjunction with 710, may include a match with a cryptographic signature that used an expired certificate. As another example, a near match of external addresses against a whitelist, as discussed in conjunction with 708, may include finding some level of match that may be insufficient to achieve the specified threshold. As another example, a near match of mailing list specific attributes against a whitelist, as discussed in conjunction with 705, may include a match of some specific mailing list features not sufficient enough to reach a matching threshold.

Figure 8:
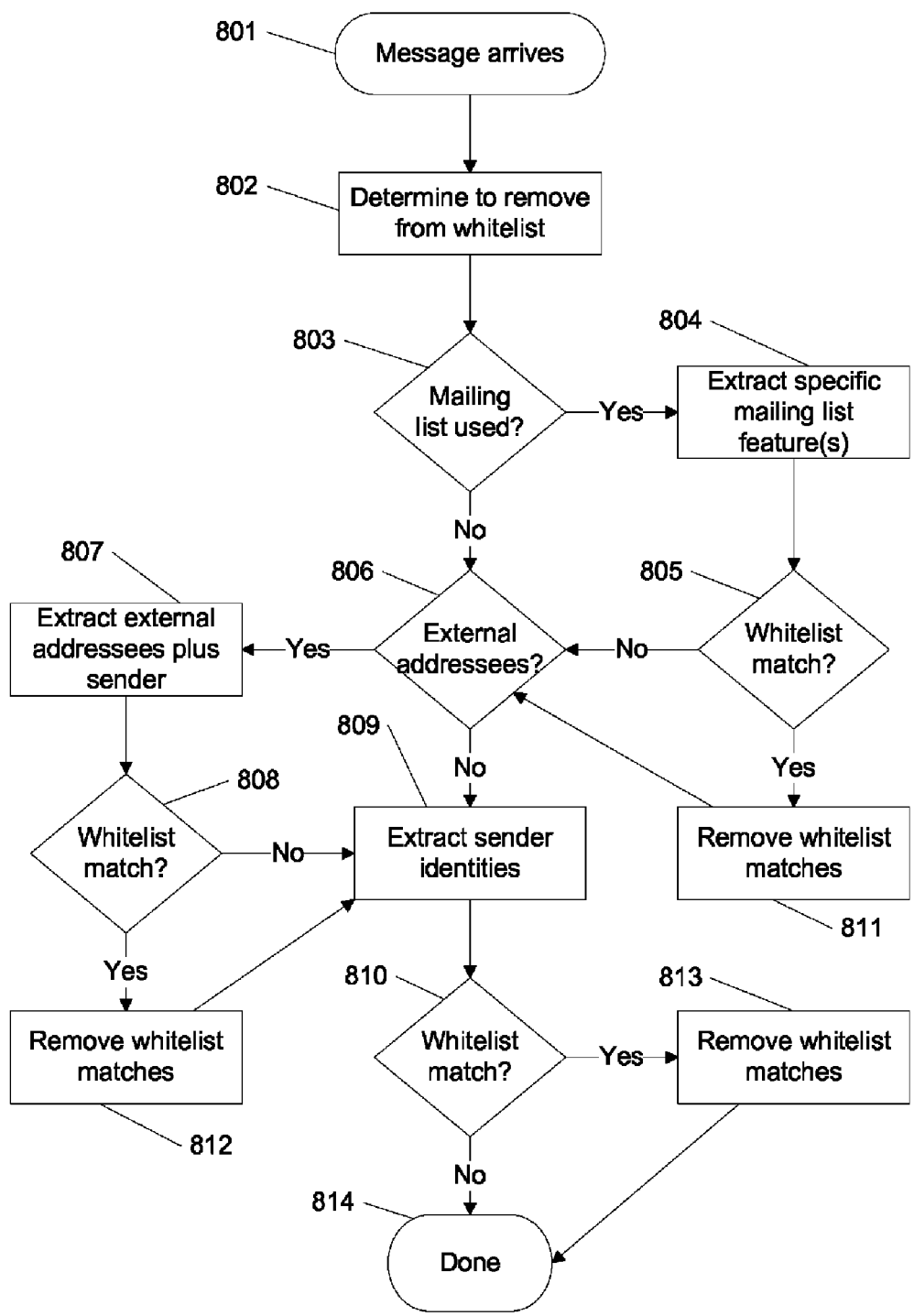
FIG. 8 is a flow diagram of a method for removing zero or more whitelist entries related to a message, according to some embodiments.

FIG. 8 is a flow diagram of a method for removing zero or more whitelist entries related to a message, according to some embodiments. In this example, a message arrives (801). For example, a message such as an email may be received by a messaging subsystem 101 as discussed in conjunction with FIG. 1. A determination to remove related entries from whitelist may be made (802). For example, a determination may be made by a user specifying that a message is spam, that a message should not match a whitelist, and/or that a specified attribute of a message should not match a whitelist. An example of such a specification is election via a user interface, such as a radio button in a dialog box that specifies an option such as categorizing a message as spam, or de-whitelisting the message.

A message may be tested to determine whether a mailing list was used (803). The test may, for example, be performed as discussed earlier in conjunction with 603 of FIG. 6. If a mailing list was used (803), then specific mailing list features are extracted (804) in this example. The extraction may be performed, for example, as discussed earlier in conjunction with 604 of FIG. 6.

A comparison of extracted features may be made with a whitelist (805). The comparison may, for example, be performed as discussed earlier in conjunction with 705 of FIG. 7. If there is a whitelist match (805), then one or more matching whitelist entries are removed (811) in this example. In some embodiments, all matching entries may be removed. A test for external addressees (806) may be performed.

If there is no whitelist match (805), then a test for external addressees (806) is performed in this example. If there was no mailing list used (803), then a test for external addressees (806) is performed in this example.

A message may be tested for external addressees (806). The test may, for example be performed as discussed earlier in conjunction with 606 of FIG. 6. If external addressees are found (806), then addresses of external addressees plus sender are extracted (807) in this example. Extraction may, for example, be performed as discussed earlier in conjunction with 607 of FIG. 6.

A comparison of extracted addresses may be made with a whitelist (808). A comparison may, for example, be performed as discussed earlier in conjunction with 708 of FIG. 7. If there is a whitelist match (808), then one or more matching whitelist entries are removed (812) in this example. In some embodiments, all matching entries may be removed. One or more sender identities may be extracted from a message (809).

If no external addressees are found (806), or if there are no whitelist matches (808), then one or more sender identities are extracted from the message (809) in this example. An example of extracting sender identities was discussed earlier in conjunction with 609 of FIG. 6.

An extracted sender identity may be compared with a whitelist (810). A comparison may, for example, be performed as discussed earlier in conjunction with 710 of FIG. 7. If there is a whitelist match (810) then one or more matching entries are removed from a whitelist (813) in this example. In some embodiments, removing an entry that is associated with a certificate of authorization from a whitelist may include revoking a certificate. Ways to revoke a certificate are known to those skilled in art, and include adding a certificate to a list of revoked certificates. Processing may be complete (814). If there is no whitelist match (810), then processing is complete (814) in this example.

In some embodiments, a whitelist such as a whitelist used to hold specific mailing list features, a whitelist used to hold sender/recipient addresses, or a whitelist used to hold sender addresses, may contain hashes of content. An example of a whitelist that records a hash of its content is a privacy enhanced list, as will be described in conjunction with FIGS. 14 and 15. In some embodiments, a test for a match in a whitelist, such as those performed in conjunction with 805, 808, or 810, may involve matching the hash of the content. For example, a hash of an identity may be checked for in a whitelist instead of an identity.

Figure 9:
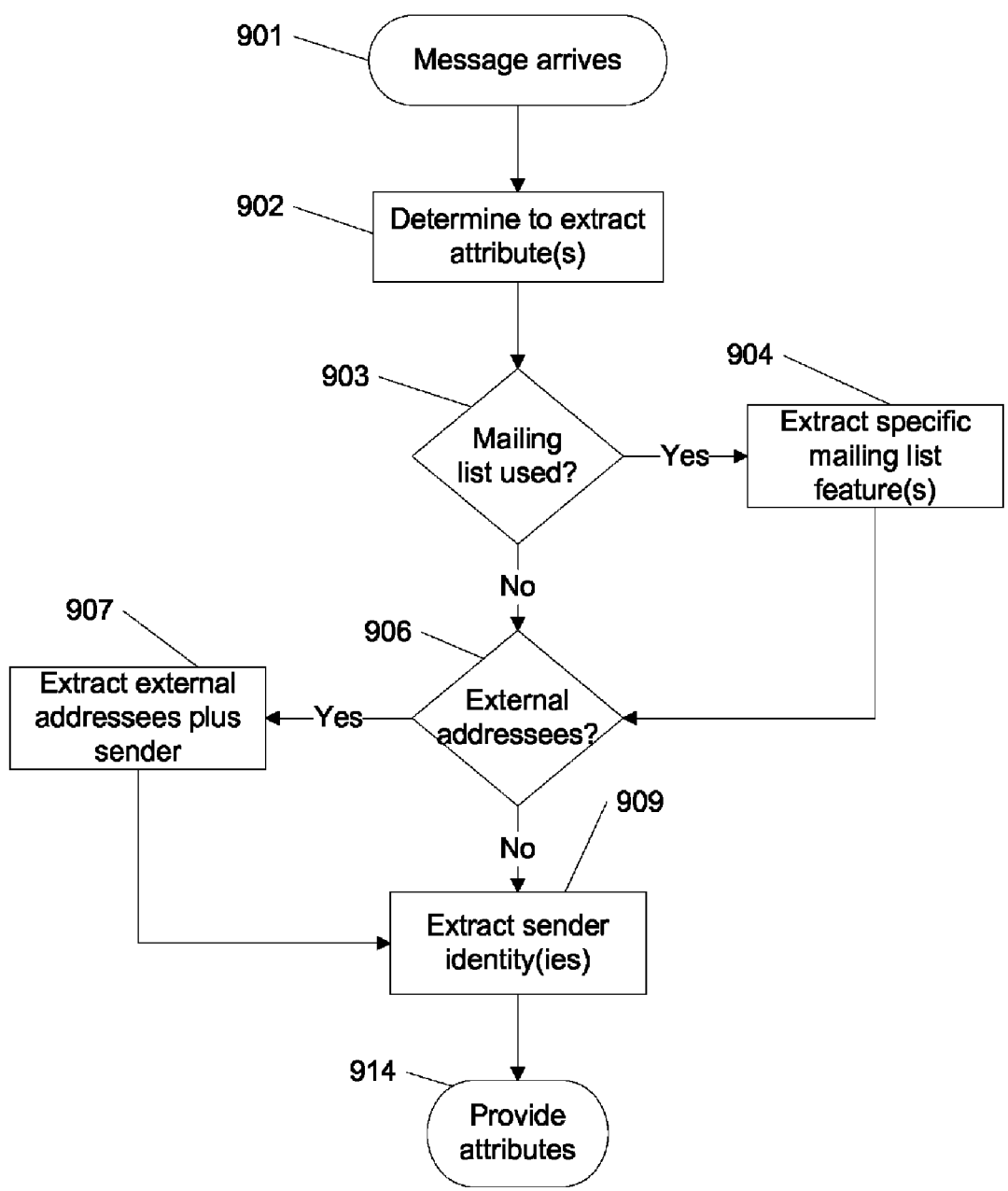
FIG. 9 is a flow diagram of a method for extracting attributes related to a message, according to some embodiments.

FIG. 9 is a flow diagram of a method for extracting attributes related to a message, according to some embodiments. In this example, a message arrives (901). For example, a message such as an email may be received by a messaging subsystem 101 as discussed in conjunction with FIG. 1. A determination to extract attributes may be made (902).

A message may be tested to see if a mailing list was used (903), for example as discussed above in conjunction with 603 of FIG. 6. If a mailing list was used (903), then specific mailing list feature(s) are extracted (904) in this example. The extraction may, for example, use approaches such as those discussed previously in conjunction with 604 of FIG. 6. A test for external addressees (906) may be performed. If a mailing list is not used (903) then a test for external addressees (906) is performed in this example.

External addressees may be tested for (906), for example as discussed previously in conjunction with 606 of FIG. 6. If a message has external addressees (906) then addresses for external addressees and sender are extracted (907) in this example. Extraction may, for example, be done as discussed previously in conjunction with 607 of FIG. 6. One or more sender identities may be extracted (909). If there are no external addressees found (906) then one or more sender identities are extracted (909) in this example.

Extraction of one or more sender identities (909) may, for example, be performed as discussed in conjunction with 609 of FIG. 6.

The extracted attributes may be provided (914). In some embodiments, these attributes may include specific mailing list features (904), external addressees plus sender (907), and/or one or more sender identities (909).

In some embodiments, in addition to or as an alternative to what is illustrated in FIG. 9, extracted attributes may be obtained during other processing of a message. For example, attributes may be obtained during a whitelist addition, for example as described in conjunction with FIG. 6, during whitelist evaluation, for example as described in conjunction with FIG. 7, and/or during whitelist removal, for example as described in conjunction with FIG. 8. In some embodiments, extracted attributes may be used in probabilistic whitelisting, for example as described in conjunction with FIG. 10.

Figure 10:
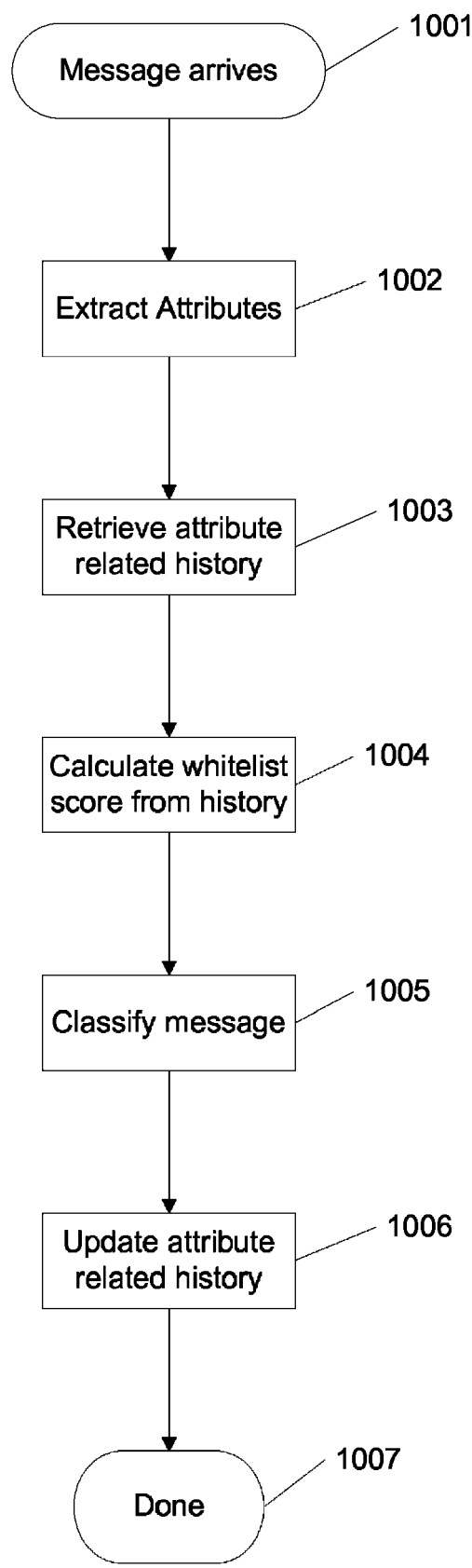
FIG. 10 is a flow diagram of a method for probabilistically whitelisting a message, according to some embodiments.

FIG. 10 is a flow diagram of a method for probabilistically whitelisting a message, according to some embodiments. Probabilistic whitelisting refers herein to the use of attributes associated with a message to assist in content classification. In this example, a message arrives (1001). For example, a message such as an email may be received by a messaging subsystem 101 as discussed in conjunction with FIG. 1.

Attributes may be extracted from a message (1002). An example of an attribute is a sender's identity, for example as provided in a "From" header line of an email. Examples of extracting attributes are discussed in conjunction with FIG. 9.

Attribute related history may be retrieved (1003). In some embodiments, an attribute history may include a detailed history, such as a list of messages that possessed an attribute. An example of history for an attribute such as a sender's address is the date of the first message received from that sender, or equivalently, the amount of time since the receipt of the first message from that sender. In some embodiments, attribute history may be stored as a statistical aggregation of messages with a given attribute. Examples of statistical history for an attribute such as a sender's address include the number of non-spam messages received from that sender; the average spam likelihood score of a sender's messages as determined by a content classifier; whether any of the sender's messages have been classified as spam; and/or the viewing pattern of the recipient for messages from this sender A whitelist score may be calculated from the history (1004). A whitelist score refers herein to one or more summaries of the retrieved history (1003). As a first example, a whitelist score may be calculated as 0 if any extracted attribute had ever been found in a related message that was classified as spam, and calculated as 1 otherwise. As a second example, a whitelist score may be calculated as (number of related non-spam messages)*(1−average spam likelihood of related messages)−20*(number of related spam messages), clamped to the range [0 . . . 1].

A message may be classified (1005). In some embodiments, the classification may use message content. In some embodiments, the classification may use a whitelist score. In some embodiments, the classification may use the retrieved history. In some embodiments, the classification may use extracted attributes. For example, a classifier may construct a final spam probability based on ⅔ of the result provided by message content analysis, and ⅓ of the result provided by the whitelist score. As another example, a text classifier, such as a Bayesian filter, may produce a result by first concatenating the list of extracted attributes to the message, and then classifying that larger aggregate. In such a concatenation example, the attribute list may be represented in a variety of ways, including a textual list of attribute names and values. For example, if a message had whitelist attributes based on being sent by SENDER and had MAILINGLIST1, RECIPIENT1 and RECIPIENT2 on a distribution list, then a textual representation of "(from,SENDER), (to,RECIPIENT1), (to, RECIPIENT2), (list,MAILINGLIST1)" may be used to represent the related attributes in the text concatenation. As another example of a representation of attributes, a message signed by SIGNER, using a certificate that was issued by CERTIFICATE_AUTHORITY may have a text representation of "(signedby,SIGNER), (signerca, CERTIFICATE_AUTHORITY)"

History information related to extracted attribute(s) may be updated (1006). For example, a spam likelihood score produced in a message classification may be integrated into the history for extracted attribute(s). As a more specific example in which history is the number of non-spam messages received with a given attribute, the tally for an attribute may be incremented if the classification is below a spam threshold.

Processing may be complete (1007).

Figure 11:
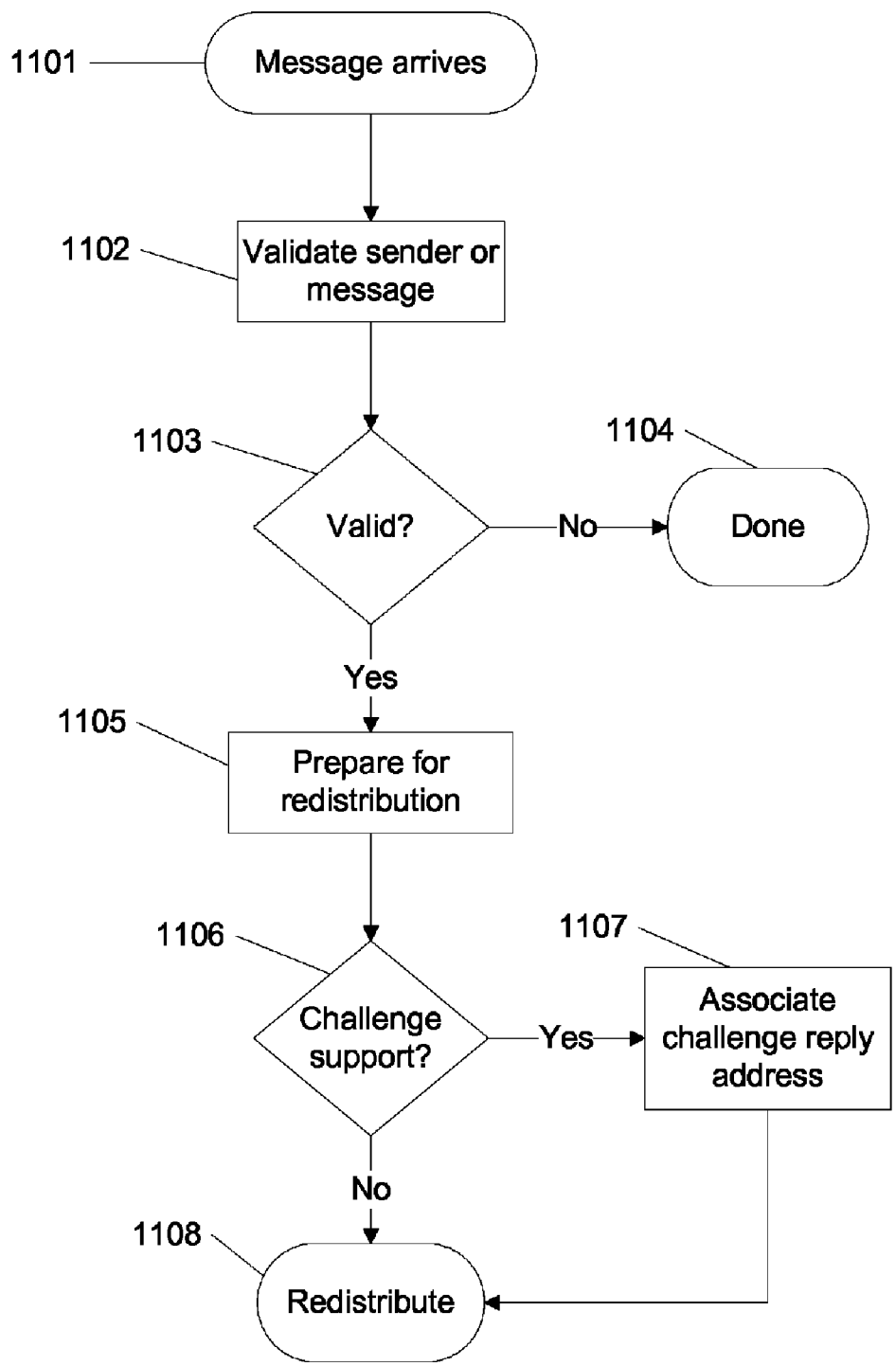
FIG. 11 is a flow diagram of a method for retransmitting a message with additional challenge support, according to some embodiments.

FIG. 11 is a flow diagram of a method for retransmitting a message with additional challenge support, according to some embodiments. In this example, a message arrives (801). For example, a message such as an email may be received by a messaging subsystem 101 as discussed in conjunction with FIG. 1.

Validation of a sender or message (1102) may be performed. For example, validation may include checking attributes, such as a sender identity, against a whitelist of valid sources of messages. As another example of validation, a challenge may be sent to the message source, and the message may be held in a message pool pending a validating response. As another example of validation, a message may be held in a message pool pending validation by a user, such as a list moderator. As another example, the content may be validated to be non-spam by a content analyzer.

A check for the resulting validity (1103) may be performed. If a message is not valid (1103), then processing is complete (1104) in this example. If a message is valid (1103), then preparation for redistribution (1105) is performed in this example.

Preparation for redistribution (1105) may include modification of a message to indicate that it is redistributed. For example, the subject line of a message may be modified by adding a prefix such as "[listname]." Additional examples of modifications for bulk mail redistribution service were discussed in conjunction with 604 of FIG. 6. Another example of preparation for redistribution (1105) may include retrieving a subscription list. A subscriber list refers herein to a list of one or more addresses that may receive a forwarded copy of a message. In some embodiments, a subscription list may be short, such as having only one member. For example, the redistribution described in FIG. 11 may serve as a proxy spam filter for a single recipient. Another example of preparation for redistribution (1105) may include encapsulating a copy of some or all of an original message in a modified copy of the message. For example, a cryptographically signed message may be encapsulated. Encapsulated copies may later be examined by recipients, for example to authenticate a more original source and content using a signature. In some embodiments, encapsulation may be effectively performed by providing a delta, for example by listing the changes that may be made to a prepared message in order to recover an original message.

A determination may be made as to whether additional challenge support may be inserted (1106). In some embodiments, challenge support determination may be based on a preconfigured preference, for example all messages are supported, or for example no messages are supported. In some embodiments, challenge support determination may be based on the identity of a validated sender. For example, challenge support may be provided only for a specific set of identities, such as a set of moderators, or such as members of a subscriber list. In some embodiments, challenge support may be provided for messages that do not already have a challenge reply address associated with the message. A challenge reply address refers herein to an address, potentially distinct from a source address, that may be capable of receiving and/or responding to challenges. An example of a message that may not have a challenge reply address is an original message from a sender. In some embodiments, challenge support may be provided for messages that do already have a challenge reply address associated with a message. For example, some messages forwarded by other services may have a challenge reply address associated with a message.

If challenge support is provided, then a challenge reply address is associated with the message (1107) in this example. An example of associating a challenge reply address with a message is to insert the address into the message. For example, in an email message, a line may be added to the email headers of the form "X-Challenge-Address: XXX," where XXX may be an email address that may be capable of receiving and responding to challenges. A message may be redistributed (1108).

If challenge support (1106) is not provided, then a message is redistributed (1108) in this example.

Redistribution (1108) may include final preparation and/or distribution. An example of final preparation may include grouping together copies of a message destined for subsets of the distribution list. Examples of grouping include grouping based on priority of retransmission, and grouping based in similarity of addresses. Examples of final preparation include cryptographically signing one or more of the messages that may be redistributed. For example, cryptographic signatures may be created without signing the address taken from the distribution list. In such an example, a single signature may suffice for use on many distinct copies of a message. In some embodiments, signatures on outgoing messages may be created that have a short term expiration date, such as 5 days. Examples of distribution include sending a message, and making a message available, for example by placing a copy into an inbox of a recipient.

Figure 12:
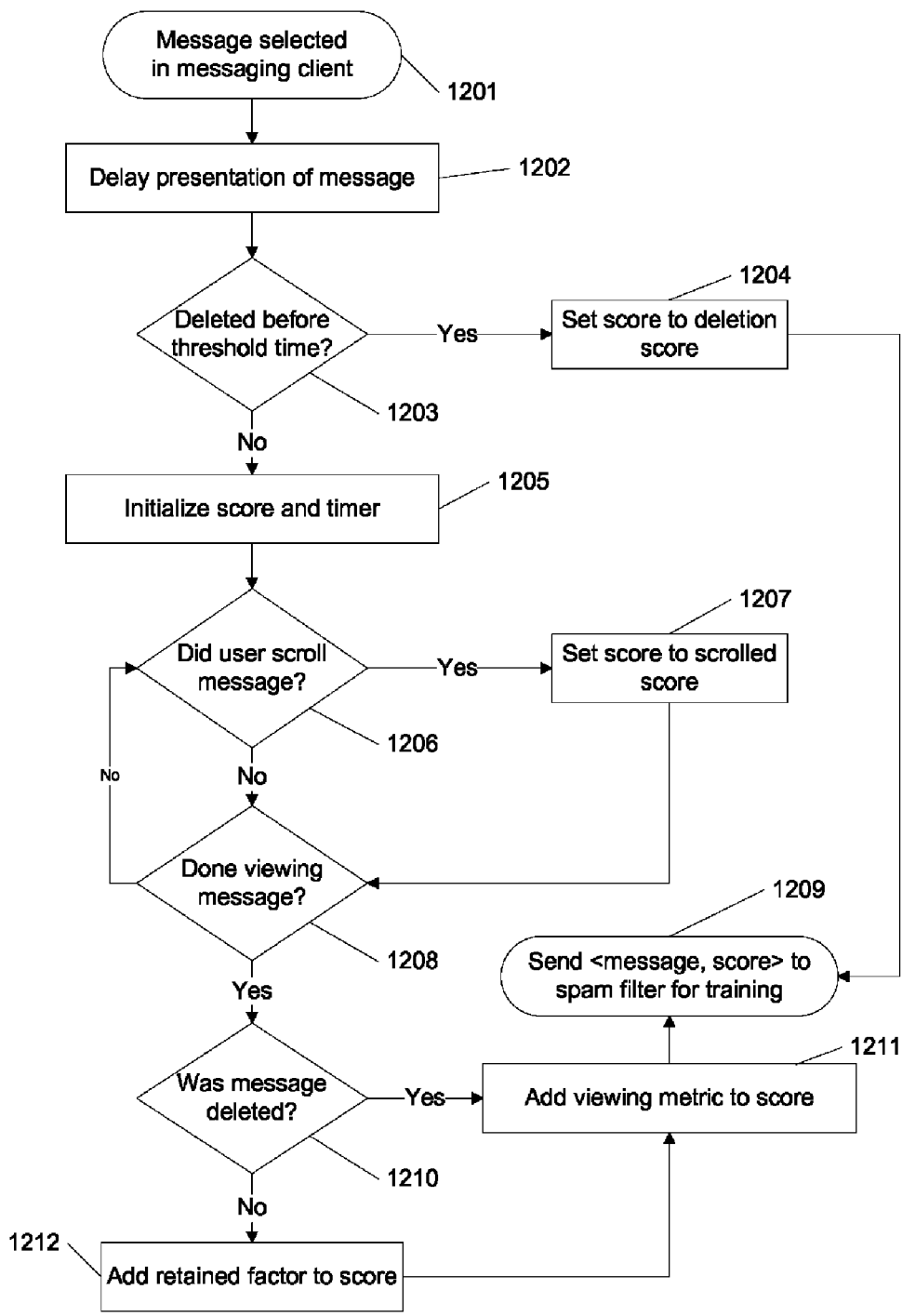
FIG. 12 is a flow diagram of a method for evaluating the likelihood of a message being spam based on a recipient's activity, according to some embodiments.

FIG. 12 is a flow diagram of a method for evaluating the likelihood of a message being spam based on a recipient's activity, according to some embodiments. In this example, a message may be selected in a messaging client (1201). As one example, a user may select a message in a UI pane showing information associated with the message, such as subject, sender identity and/or date. As another example, a user may select a "next message" control, thereby selecting a message. As another example, a user may delete a previous message, and thereby select the next message.

In some embodiments, presentation of a selected message may be delayed (1202). For example, a delay such as 1 second may be used, for example with substantially no user visible progress towards presentation of a message. Examples of user visible progress include rendering of the content of a message, or creation of a new window, and removing an old message from a window or message pane.

A test may be performed to see if a message is deleted before a threshold time (1203). A threshold time, such as 4 seconds, may be measured from when a message was selected. In some embodiments, the threshold may be the same as a delay used before presenting the message. If a message is deleted before a threshold time, then a score is set to a deletion score in this example. An example of a deletion score is −10 (negative ten). The message and score may be delivered to a spam filter for training in this example (1209), completing processing.

If a message is not deleted before the threshold time (1203), then in this example a score is initialized, for example set to 0 (zero), and a timer is initialized (1205).

It may be determined whether the message was scrolled, for example before deleting the message (1206). Examples of scrolling include pressing a "page down" key, manipulating a scroll bar, and selecting elements of the display that cause the message to scroll. If the message was scrolled (1206) then the score is set to a scrolled score (1207) in this example. An example of a scrolled score is 10 (positive ten).

It may be determined whether the message is still being viewed (1208) in this example. For example, a message may no longer be viewed when a different message is selected (including deleting the current message), a window presenting the message is closed, or the application is closed. If the message is still being viewed (1208), then it is again determined whether the message was scrolled (1206) in this example. If the message is no longer being viewed (1208), then it may be determined whether the message was deleted (1210) in this example.

An example of a test for deletion (1210) may be a review of the status of a message to see if it is marked deleted, or if it is no longer accessible (for example, whether it has been permanently removed from the system). If the message is not deleted (1210), the score is incremented by a retained factor in this example (1212). An example of a retained factor is 10 (positive ten).

A viewing metric may be added to the score (1211). A viewing metric may be based on the amount of time spent by the user in viewing a message, optionally in conjunction with message attributes such as message length. For example, a viewing metric may be calculated based on the time since the timer was initialized, along with the message length. In such an example, the viewing time may be calculated in seconds, and the viewing metric may be calculated by multiplying the viewing time by a factor such as 10, dividing by the length of the message in bytes, and truncating it to a maximum value of 30. Other factors (not shown) may be incorporated into a viewing metric. Examples of these other factors include viewing the entirety of the message (via scrolling), reading attachments, and traversing enclosed links (for example using a browser). Another factor that may be used is a period of long inactivity, such as more than two minutes without any user interaction, which may diminish the application of the viewing metric. A message and score may be delivered to a spam filter for training (1209), completing processing in this example.

In some embodiments, a message viewed in excess of a threshold of time, for example 5 seconds, may be categorized as non-spam. Such a threshold may be fixed, or may be variable, for example a linear function of the length of the message. Viewing time may, for example, be calculated as discussed in conjunction with a viewing metric. In some embodiments, a message with a score above a threshold, for example 20, may be categorized as non-spam. In some embodiments, such a categorized non-spam message may be processed (not shown) to whitelist one or more associated attributes, for example as was discussed in conjunction with FIG. 6.

In some embodiments, a message viewed for less than a threshold length of time, for example 1 second, may be categorized as spam. Such a threshold may be fixed, or may be variable, for example a linear function of the length of the message. Viewing time may, for example, be calculated as discussed in conjunction with 1211. In some embodiments, a message with a score below a threshold, for example −10 or 3, may be categorized as spam. In some embodiments, such a categorized spam message may be processed (not shown) to remove one or more associated attributes from a whitelist, for example as was discussed in conjunction with FIG. 8. In some embodiments, such a categorized spam message may be processed (not shown) to blacklist its sender.

Figure 13:
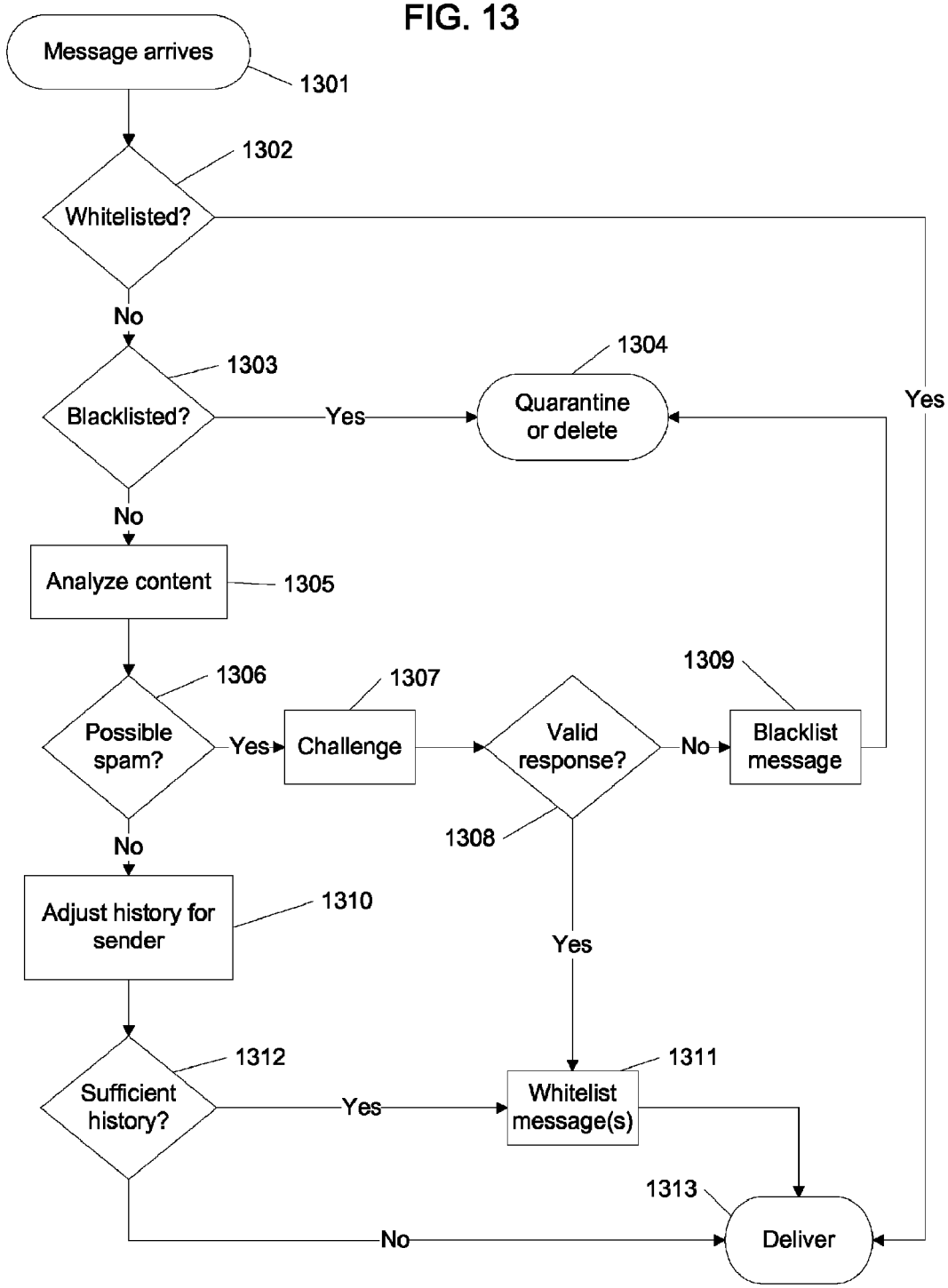
FIG. 13 is a flow diagram of a method for whitelisting based on a sender's history, according to some embodiments.

FIG. 13 is a flow diagram of a method for whitelisting based on a sender's history, according to some embodiments. In this example, a message arrives (1301). For example, a message such as an email may be received by a messaging subsystem 101 as discussed in conjunction with FIG. 1. It may be determined whether the message is whitelisted (1302), for example as was discussed in conjunction with FIG. 7.

If a message is whitelisted (1302), then the message is delivered (1313) in this example. An example of delivery includes placement in a message folder, such as an inbox, where the message may be viewed by a recipient. Delivery completes the processing in this example.

If a message is not whitelisted (1302), then it is determined whether the message is blacklisted (1303) in this example. A blacklist may include a list of message attributes, such as a sender's identity, that may be grounds for automatic categorization of a message as spam.

If a message is blacklisted (1303), then the message is quarantined or deleted (1304) in this example. An example of quarantine includes placement of a message in a location that may be reserved to hold spam messages, such as an email "spam" folder. Quarantine or deletion completes the processing in this example.

If a message is not blacklisted (1303), then its content is analyzed (1305) in this example. Examples of content analysis include the use of a Bayesian filter, the user of a fixed rule set, or the use of a support vector machine.

If the message is determined to be possible spam (1306), then a challenge (1307) is sent in this example. For example, a challenge may be constructed and a response evaluated by challenge response subsystem 104 as discussed in conjunction with FIG. 1.

If a valid response (1308) is not received to a challenge (1307), then the message is blacklisted in this example. An example of blacklisting a message is to place one or more attributes, such as a sender's identity, on a blacklist. Another example of blacklisting a message is the removal of one or more message attributes from one or more whitelists, for example as was discussed in conjunction with FIG. 8. Quarantine or deletion (1304) may be performed, completing the processing in this example.

If a valid response is received to a challenge (1308) then the message is whitelisted (1311) in this example. An example of whitelisting attributes of a message was discussed in conjunction with FIG. 6. One or more associated messages associated with the response may be delivered (1313), completing the processing in this example. One example of a message associated with the response is the message received in 1301. Another example of a message associated with the response is a message sharing an attribute, such as a sender, with the message received in 1301.

If the message is not determined to be possible spam (1306), then the history for the sender is adjusted (1310) in this example. In some embodiments, a history of analysis may be recorded for some or all senders. In such examples, adjustment may involve appending the analysis to any existing history for the sender. In some embodiments, a statistical summary of historical analysis may be recorded for some or all senders. For example, a statistical history of the number of non-spam messages received from a sender may be kept, and adjustment may include incrementing that count. Another example of a statistical history of a sender is the sum or average of the probabilities that each received message from the sender was not spam. Another example of a statistical history is the product of the probabilities that each message received from the sender was spam. Another example of a statistical history is the count of the number of messages that have been analyzed (1305) that had less than a threshold probability of being spam, such as a threshold of 50%.

One or more tests may be performed to see if the sender has sufficient history (1312) of not sending spam. For example, if the statistical history recorded is the number of previous non-spam message, then an example of a sufficient history is a number of messages above a threshold, for example 10 messages. In an example where a more complete historical record is kept, an example of a sufficient history is a number of messages above a threshold, such as 10 messages, and at least a threshold period of time since receipt of the first such message, for example three days. In an example where a statistical history kept is the product of the probabilities that each message is spam, an example of a sufficient history is a product less than a threshold, such as 1/10000.

If sufficient history has been collected, then the message is whitelisted (1311) in this example. In some embodiments (not shown), a user interface may allow a user to accept or decline the whitelisting.

If a sufficient history has not been collected (1312), then the message is delivered (1313) in this example.

In some embodiments, a previously received message may be processed to prepopulate a history for a sender. For example, one or more messages in an inbox, such as old messages, may be processed by analyzing their content, validating whether they are possible spam, and adjusting a history. In some embodiments, such processing may be done automatically, for example during installation of a messaging application such as an email client or an anti-spam application. In some embodiments, such processing may be performed automatically during a recovery from a failure, for example when some or all prior analysis history is lost. In some embodiments, such processing may be performed manually, for example by a user designating a source of previously received messages, such as a messaging folder.

Figure 14:
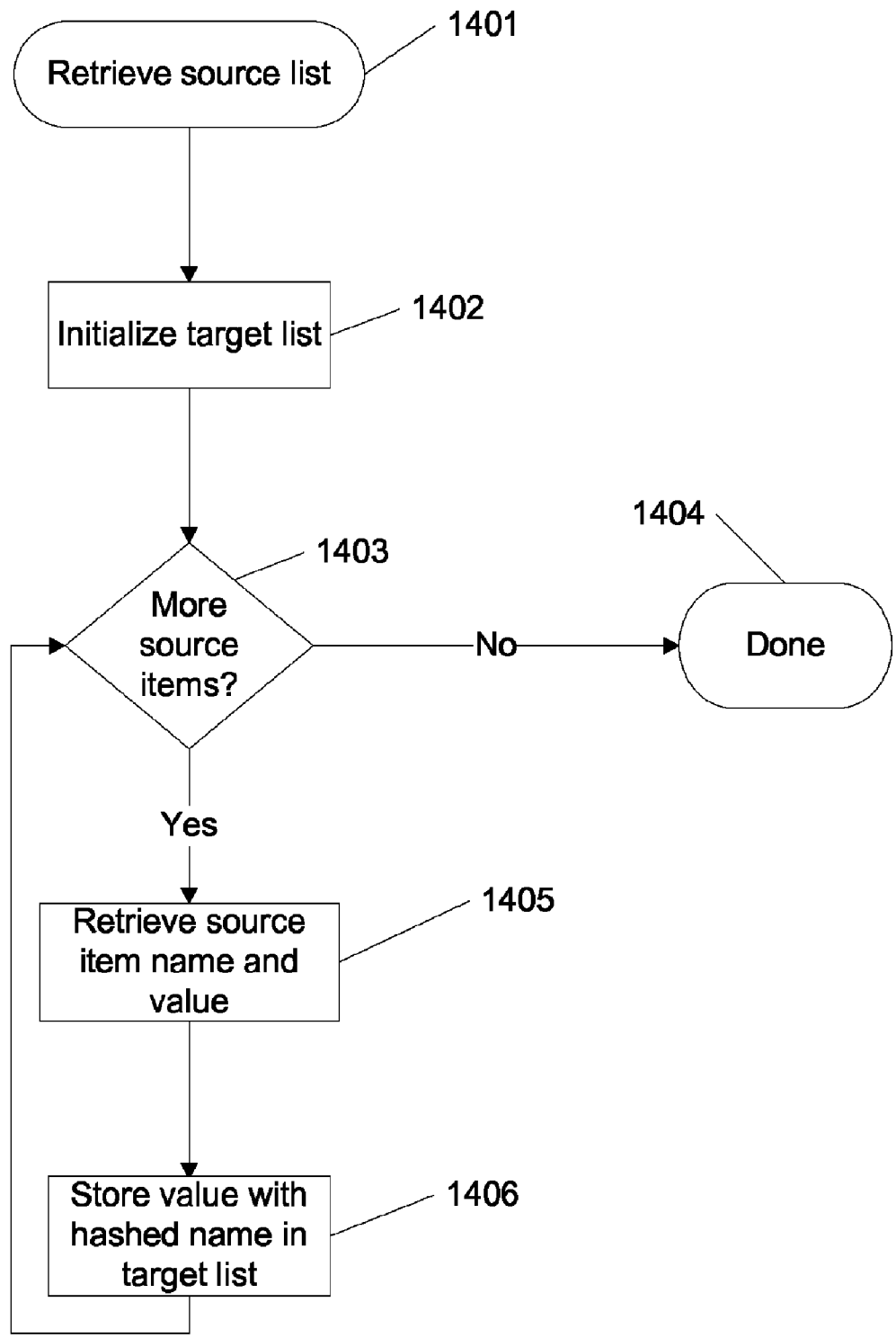
FIG. 14 is a flow diagram of a method for updating a privacy enhanced list, according to some embodiments.

FIG. 14 is a flow diagram of a method for updating a privacy enhanced list, according to some embodiments. In this example, a source list may be retrieved (1401). Examples of a source list include a whitelist, a probabilistic whitelist, a blacklist, and a word/phrase list used by a content classifier.

A target list may be initialized (1402). Examples of initialization include creation of an empty list, and reservation of storage to hold a list.

A test may be performed to see if there are any unprocessed source items in the source list (1403). For example, a counter may be maintained of the number of elements in a source list, and compared with the number of elements processed. If there are no more source items (1403), then processing is complete (1404) in this example.

If there are more source items (1403), then a source item name and optional value are retrieved (1405) in this example. As an example, in a whitelist, a name may be a sender's identity, and a value may be an approval (whitelist) code, such as the value 1. As a second example, in a probabilistic whitelist, a name may be a sender's identity, and a value may be a probability of acceptability, such as 0.9. As another example, a list may have no value associated with a name. Additional examples of names and values include blacklisted sender addresses, blacklisted message transfer agents, word and/or phrase data as used in text classifiers, whitelisted sender addresses, trusted certification authorities, etc.

A retrieved value (if any) may be stored with a hashed name in the target list (1406). Examples of hashing functions include CRC32, MD5, and SHA-1. In some embodiments, hashing functions may be used that have significant collision probability, such as a hash that results in a 16 bit number. In some embodiments, hashing functions may be used that have minimal collision probabilities, such as a cryptographic hash. In some embodiments, a keyed hash may be performed, for example by mixing a fixed key value with the item name before performing a hash. A test for additional unprocessed items in the source list (1403) may be performed again.

In some embodiments (not shown), privacy enhanced lists may be maintained, rather than constructed anew as discussed in conjunction with FIG. 14. For example, changes made to a source list may be mirrored in a corresponding privacy enhanced target list.

Figure 15:
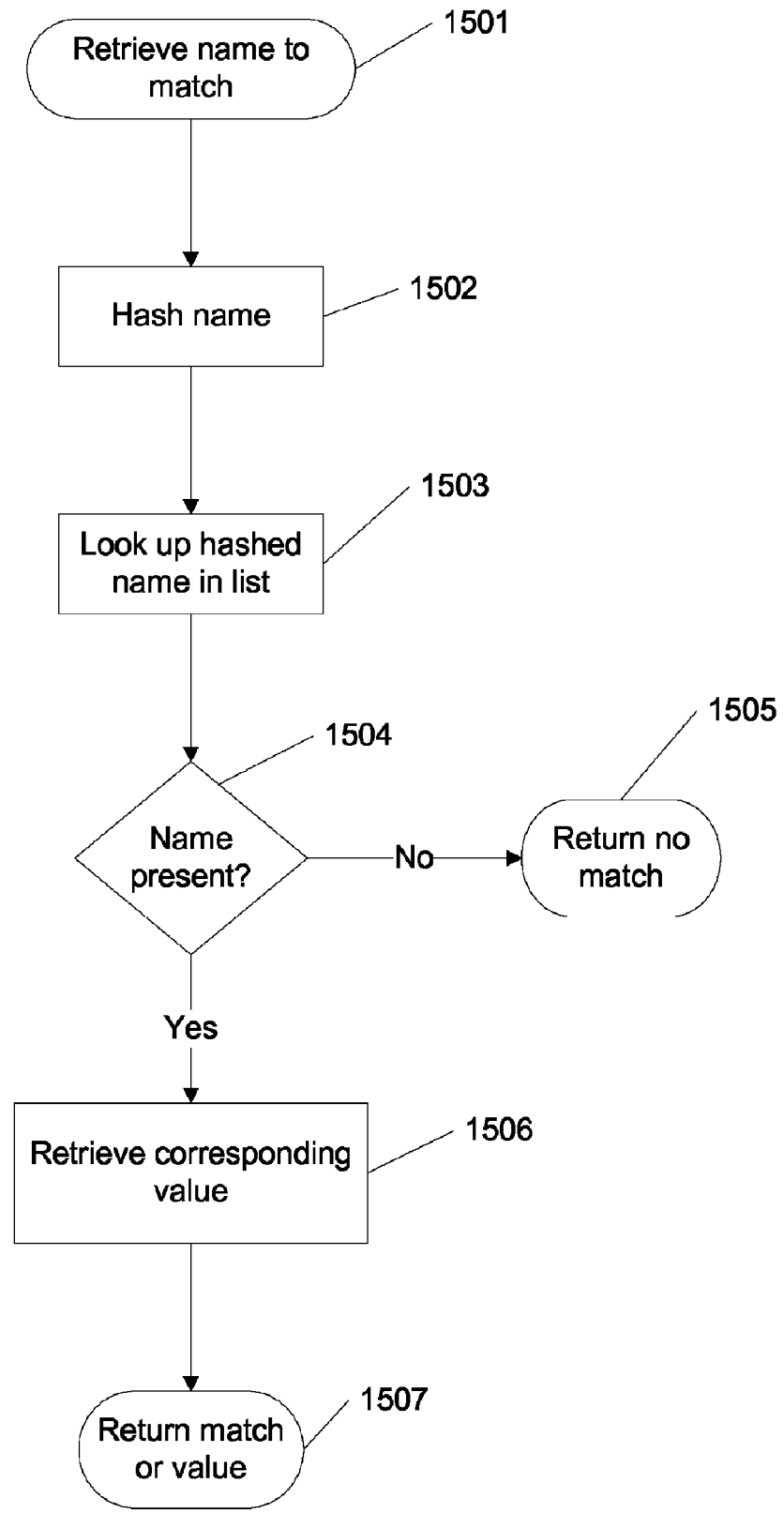
FIG. 15 is a flow diagram of a method for matching a name in a privacy enhanced list, according to some embodiments.

FIG. 15 is a flow diagram of a method for matching a name in a privacy enhanced list, according to some embodiments. In this context, a name refers to any key in a list of name/value pairs. Examples of a name include an identity, a set of external addressees, a set of one or more mailing list specific attributes, and an item of classifier metadata such as a word or phrase. In this example, a name to match may be retrieved (1501). An example of a name is a sender's identity, such as a sender's email address or sender's cryptographic credentials.

The name may be hashed (1502). For example, a hash function substantially identical to a hash function used to construct a privacy enhanced list may be applied. Hash functions for use in creation of privacy enhanced lists were discussed in conjunction with FIG. 14.

A hashed value may be looked up in a privacy enhanced list (1503). If the hashed name is not present (1504) then a failure to match (1505) is returned in this example.

If the hashed name is present (1504) then a corresponding value (if any) is retrieved (1506) in this example. A return indicating a match and/or a retrieved value may be provided (1507).

Figure 16:
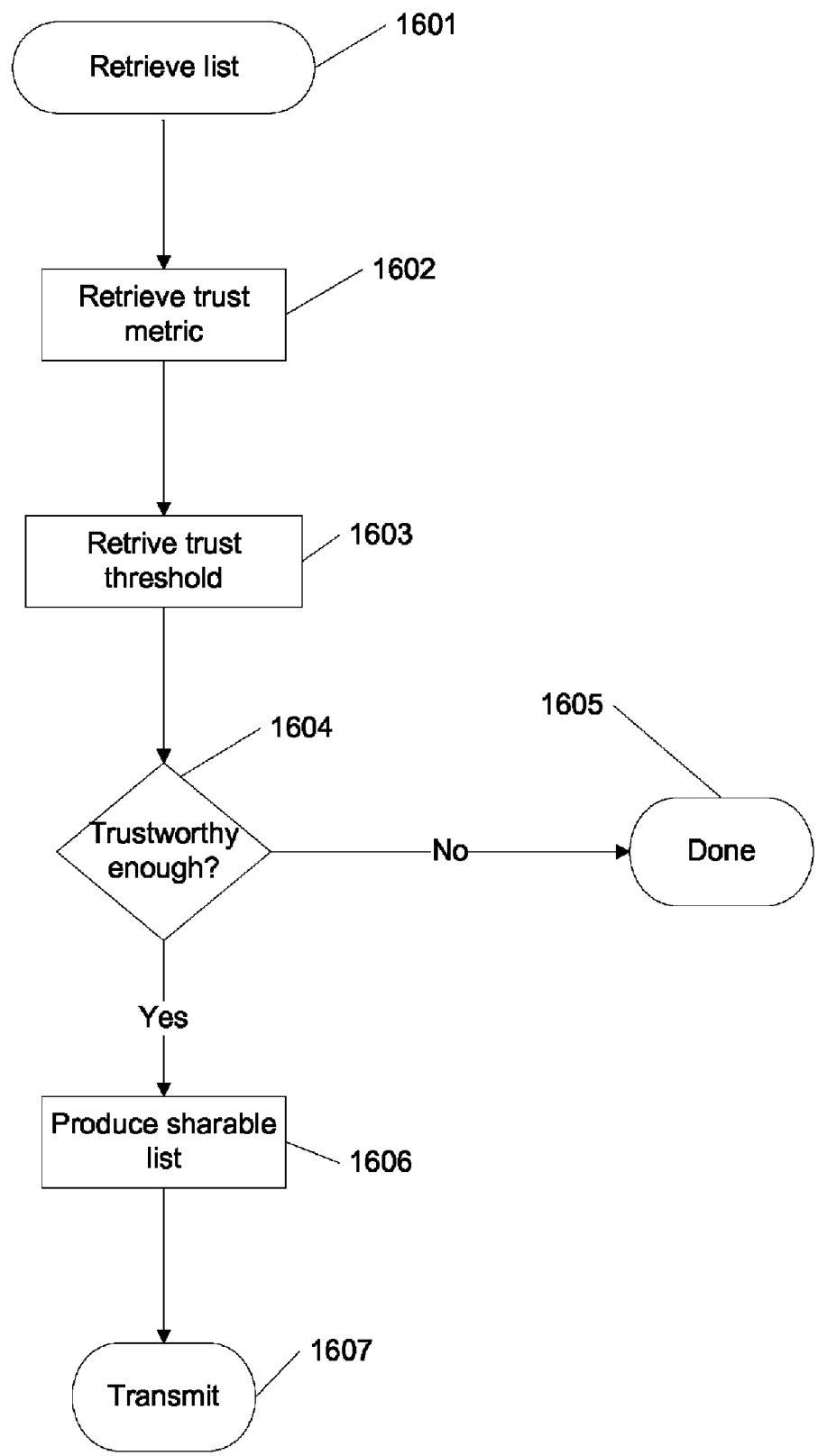
FIG. 16 is a flow diagram of a method for sharing a list, according to some embodiments.

FIG. 16 is a flow diagram of a method for sharing a list, according to some embodiments. In this example, a list may be retrieved (1601). Examples of a list include a whitelist, a probabilistic whitelist, a blacklist, and a word/phrase list used by a content classifier. In some embodiments, a retrieved list may be a privacy enhanced list.

A trust metric associated with the list may be retrieved or calculated (1602). As an example, a trust metric for a locally generated list may be 100% trusted. As another example, a trust metric for a list obtained from another source may be 50% trusted. In some embodiments, trust metrics may be determined using trust levels relative to locally generated data, such as the above percentage trust, statistical information about the source of the list, such as how many peers had forwarded the table, and/or a history of the handling of the list, such as the sequence of peers that had forwarded the list.

A trust threshold may be retrieved (1603). In some embodiments, a threshold may be a predetermined value, such as zero, or a value that corresponds to less trust than any trust metric associated with a list. In some embodiments, a retrieved threshold may be associated with a potential recipient of a list. In some embodiments, a recipient of a list may specify a threshold to a source of a list.

A comparison of trust may be made (1604) between the trust metric and a threshold. If the list's trust metric is not trustworthy enough (1604) then processing is complete (1605) in this example.

If the list's trust metric is trustworthy enough (1604), then a sharable list is produced (1606) in this example. Examples of a sharable list include a copy of some or all of a retrieved list (1601), or a privacy enhanced copy of some or all of a retrieved list. An example of construction of a privacy enhanced copy of a list is discussed in conjunction with FIG. 14.

A sharable list may be transmitted (1607). Examples of transmission include transmission across a network. Examples of contents of a transmission may include a sharable list, specification of a type of list, specification of a privacy enhancing hash function (and an optional hash key), and/or a retrieved trust metric. In some embodiments, transmission may be performed for multiple lists together, for example by performing the processing described above for more than one list, combining resulting sharable lists together and transmitting the combined list.

Figure 17:
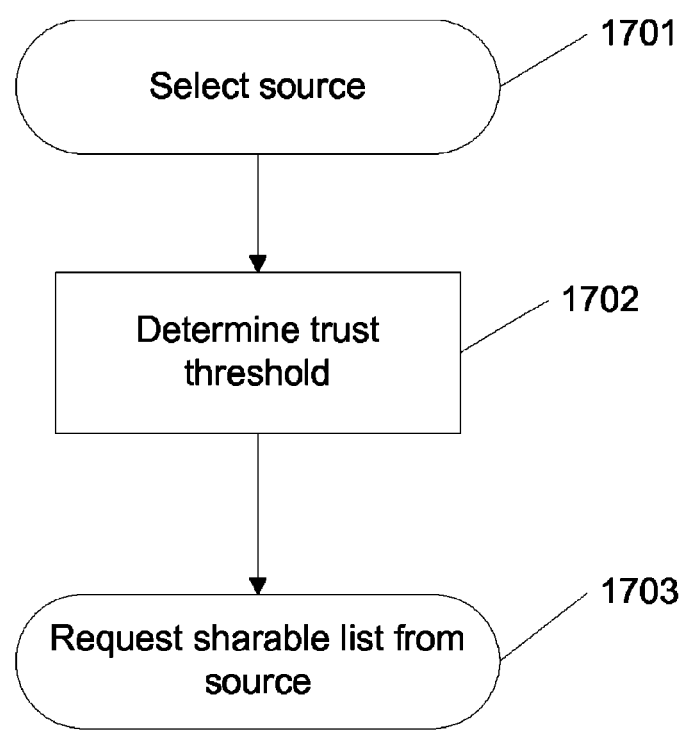
FIG. 17 is a flow diagram of a method for requesting a list, according to some embodiments.

FIG. 17 is a flow diagram of a method for requesting a list, according to some embodiments. Examples of a list include a whitelist, a probabilistic whitelist, a blacklist, and a word/phrase list used by a content classifier. In this example, a source may be selected (1701). An example of selecting a source is to select a participant in a trust network, for example a participant with which a peering relationship exists, or a participant that has advertised the availability of data, or a participant that is highly rated by other members of the trust network.

A trust threshold may optionally be determined (1702). An example of determining a trust threshold is to use a predetermined trust threshold. Another example of determining a trust threshold is to use a stored trust threshold, for example a threshold associated with the source. Another example of determining a trust threshold is to calculate a trust threshold for the source. In some embodiments, calculating a trust threshold for the source may include using a predetermined absolute trust threshold and a trust score associated with the source, for example by multiplying them together. A sharable list may be requested from the source, optionally including the trust threshold (1703).

Figure 18:
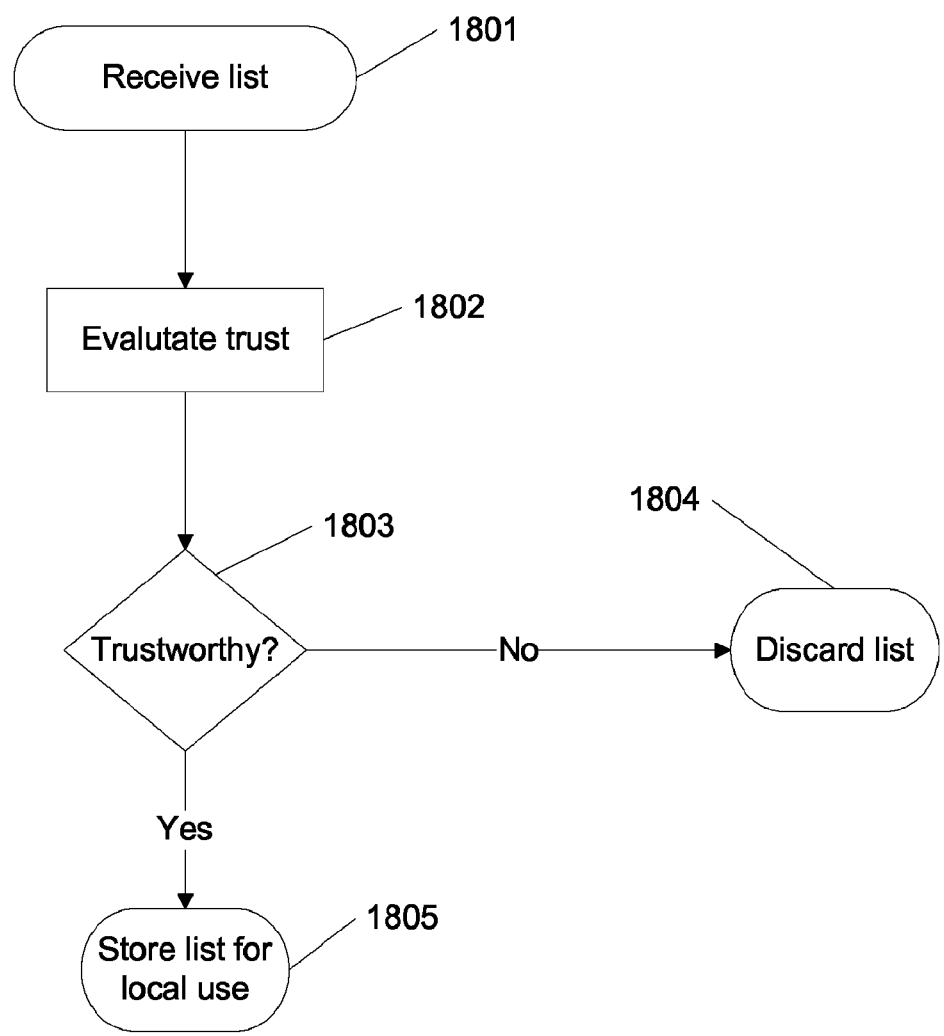
FIG. 18 is a flow diagram of a method for incorporating a list, according to some embodiments.

FIG. 18 is a flow diagram of a method for incorporating a list, according to some embodiments. In this example, a list may be received (1801). Examples of a list include a whitelist, a probabilistic whitelist, a blacklist, and a word/phrase list used by a content classifier. In some embodiments, a received list may include a trust metric, and/or a hash function (and optional key) for accessing a privacy enhanced list.

An evaluation of the trustworthiness of a list may be performed (1802). For example, a list obtained from a trustworthy source, such as a vendor of anti-spam data, may be very trusted, such as 100% trusted. As another example, a list generated by a peer that has historically been trustworthy, may be somewhat trusted, such as 75%. As another example, a list that is provided by the transmitting party with an associated trust metric may be trusted as a combination of the associated trust metric, and the trustworthiness of the transmitting party. In such an example, a product of the percentage trust metrics may be used as the evaluation of the overall trust of the list. In an example where a trust metric provided is the number of hops from the original source of a list, the recipient may create a trust evaluation by adding one hop to the received tally. In an example where the actual creator of the list and intermediate peers that transported the list may be provided, a trust evaluation may be based on, for example, a product of the trustworthiness of the intermediate peers and the list's source. In some embodiments, a user may manually specify a trust metric, for example on a per-source or per-dataset basis. In some embodiments, a trust metric may be obtained from a distributor of an anti-spam system. In some embodiments, a trust metric may be determined using information associated with peers, for example as described in conjunction with FIG. 19.

A test may be performed to see if the list is trustworthy beyond some threshold (1803). For example, a threshold of trust may be a list provided across less than 5 hops (intermediate transfers). Another example of a threshold is a trust evaluation greater than a specified percentage, such as 10%. In some embodiments (not shown), the recipient may divide such a trust threshold by the trust of a party that may transmit a list, and request that only lists with trust thresholds above that quotient be provided. If a list is not trustworthy (1803) then the list is discarded (1804) in this example.

If a list is trustworthy (1803) then it is stored for local use (1805) in this example. One example of local use includes retransmission of the list such as was discussed in conjunction with FIG. 16. Another example of local use is storage for use in combination with other lists as part of anti-spam processing. As an example, an evaluated trust of 100% associated with a whitelist may allow that whitelist to be used as an additional local whitelist. As another example, an evaluated trust of less than 100% associated with a received whitelist may be used to construct a contribution to a probabilistic whitelist. As an example, entries in such a probabilistic whitelist (containing probabilities that a sender provides non-spam) may be initialized to the evaluated trustworthiness of the list. As another example, an entry in a probabilistic whitelist may be initialized to the provided trustworthiness of the entry in the associated received list, multiplied by the evaluated trustworthiness of the list. An example of local use of privacy-enhanced data is discussed in conjunction with FIG. 15. In some embodiments, storage for local use may include storing an associated hash (and optional key) for use in matching against a privacy enhanced list.

A trust network refers herein to a set of parties that exchange one or more lists as discussed in conjunction with FIG. 16 and FIG. 18. In some embodiments, participants in a trust network may designate peering partners from among the trust network. These peering partner relationships may be used to determine trust network participants from whom lists will be accepted, and/or trust metrics to associate with network participants.

Figure 19:
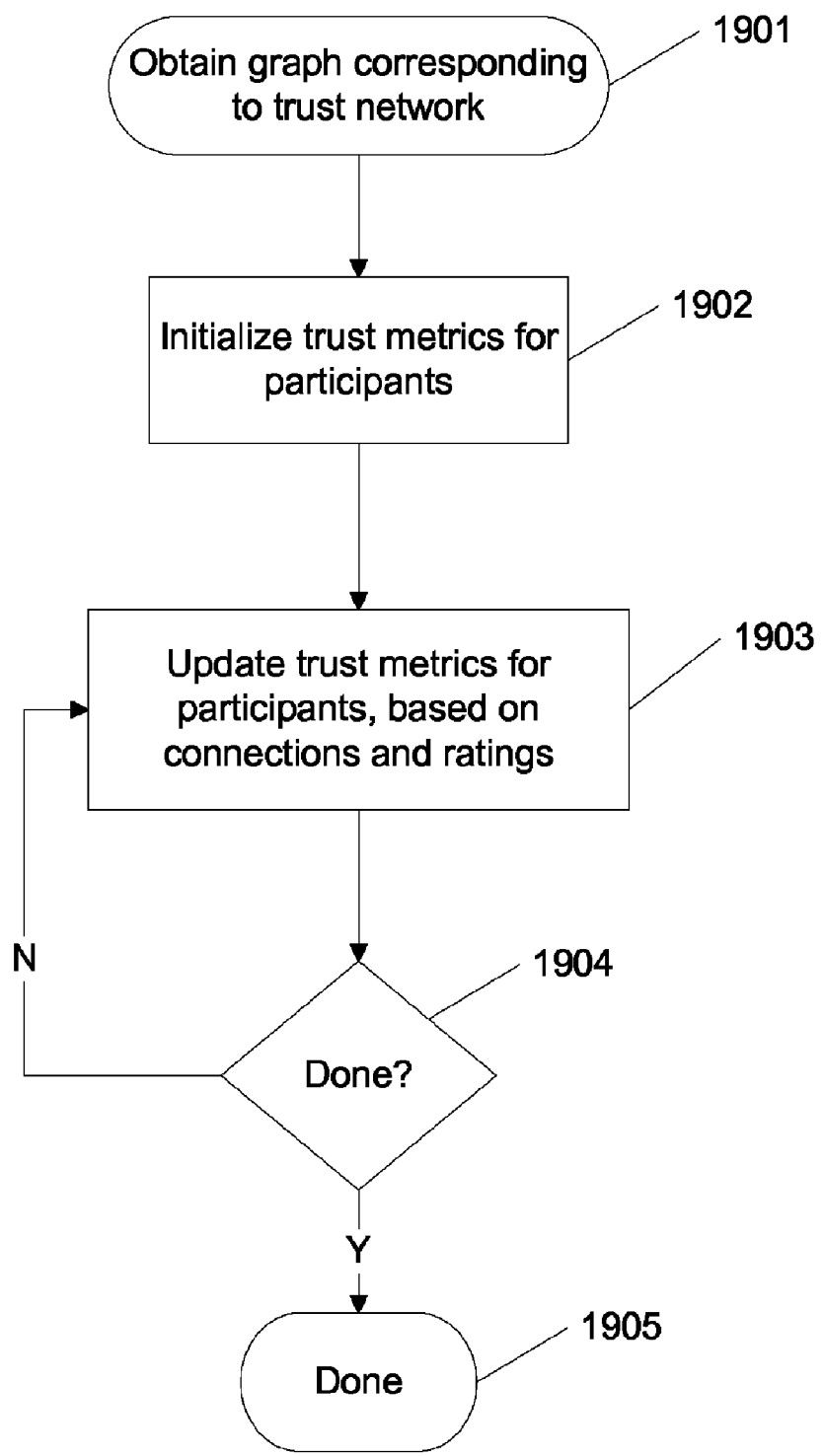
FIG. 19 is a flow diagram of a method for calculating trust metrics, according to some embodiments.

FIG. 19 is a flow diagram of a method for calculating trust metrics, according to some embodiments. In this example, a graph corresponding to a trust network may be obtained (1901). An example of a graph corresponding to a trust network is a directed graph in which nodes represent participants in the trust network, and an arc represents a peering relationship such as a trust relationship. An example of an arc representing a peering relationship is an arrangement whereby the node on the origination side of an arc trusts data from the node on the destination side of the arc. In some embodiments, an arc may have an associated rating, for example a trustworthiness rating by the node on the origination side of the arc of data received from the node on the destination side of the arc. One example of obtaining a graph is to receive the graph from a trusted source. Another example of obtaining a graph is to receive the graph from a peer. Another example of obtaining a graph is to construct the graph, for example by receiving information associated with peering relationships from one or more participants in a trust network and constructing the graph from received information.

Trust metrics for participants may be initialized (1902). An example of initializing trust metrics is to set a trust metric associated with each node in the graph to a predetermined value, such as 1.

Trust metrics for participants may be updated based on trust network information such as connection(s) and trust rating(s) associated with respective nodes (1903). An example of updating a trust metric associated with a node n is to recalculate the trust metric based on trust metrics associated with one or more nodes m for which an arc exists from m to n. In one example, trust metrics associated with all such nodes m may be summed together and optionally limited to a ceiling value such as 30. In another example, trust metrics associated with all such nodes m may be divided by the number of outgoing arcs for each m, summed together and optionally limited to a ceiling value such as 30. In some embodiments, trust metrics associated with such nodes m may be scaled using a trust rating associated with the arc from m to n, for example by multiplying the trust metric and the trust rating. In some embodiments, a copy of the graph may be created and trust metrics may be updated in the copy, using information associated with the old copy to create the updated metrics. Other details relating to calculating a trust metric associated with a node n may be found in Page, Brin, Motwani and Winograd, *The PageRank Citation Ranking: Bringing Order to the Web* (herein referred to as the PageRank paper), available from the Stanford University InfoLab, which is incorporated herein by reference for all purposes. In some embodiments, the PageRank paper may be applied by using a trust network in a manner analogous to the world wide web, a participant in a trust network in a manner analogous to a web page, and a trust relationship wherein m trusts n in a manner analogous to a hypertext link from m to n.

It may be determined whether another iteration is to be performed (1904). One example of determining whether another iteration is to be performed is to determine whether a predetermined number of iterations, such as 20, have been performed. Another example of determining whether another iteration is to be performed is to determine whether an acceptable level of convergence has been reached. One example of an acceptable level of convergence is a fixed point, or a nearly fixed point, between the last generation of the graph and the current generation of the graph. An example of an acceptable level of convergence is a percentage change no more than a threshold amount, such as 2%, in the total summed value of trust metrics, or in the percentage of nodes whose associated trust metrics have changed, or have changed more than a threshold amount, such as 10%. Additional examples of determining an acceptable level of convergence are discussed in the PageRank paper.

If it is determined that another iteration is to be performed (1904), then trust metrics are updated in this example (1903). If it is determined that another iteration is not to be performed, then processing is complete in this example (1905). In some embodiments, information associated with the graph, such as one or more trust metrics associated with trust network participants, may be made available, for example by providing them to one or more participants in the trust network. In some embodiments, a trust metric associated with a node in the graph may be used as a trust metric for the associated participant in the trust network, for example as described in conjunction with FIG. 18.

Figure 20:
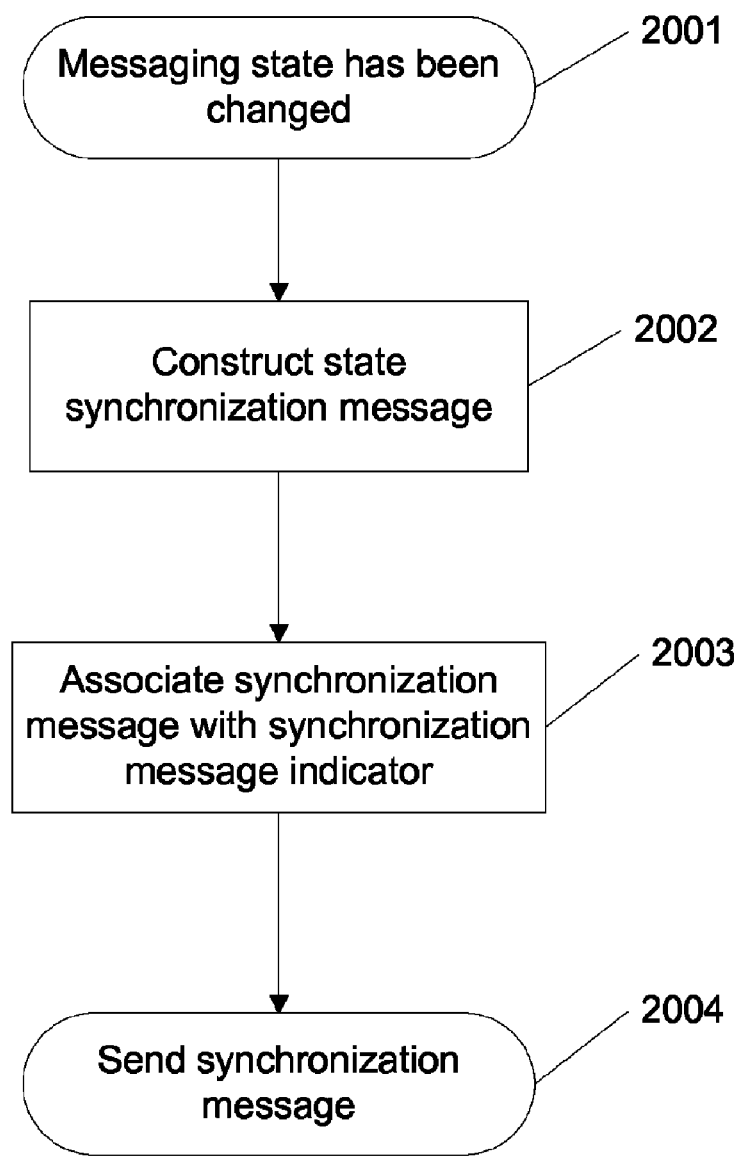
FIG. 20 is a flow diagram of a method for transmitting state information, according to some embodiments.

FIG. 20 is a flow diagram of a method for transmitting state information, according to some embodiments. In this example, messaging state has been changed (2001). One example of changed messaging state is an update to address book information, such as an addition, deletion or change to an address book entry. Another example of changed messaging state is a change or addition to a whitelist. Another example of changed messaging state is a change or addition to a digital signature. Another example of changed messaging state is an update to information used to keep track of message delivery, such as return receipts or message sequence numbers. Another example of changed messaging state is a change in an attribute associated with a message, such as whether a message such as an email has been read, or responded to, or marked as requiring further action. Another example of changed messaging state is a change in the status of a message, for example deleting the message.

A state synchronization message may be constructed (2002). An example of constructing a synchronization message is to create a message that includes information about changed state, for example a message of the same type as a message handled by the messaging subsystem 101 of FIG. 1, such as an email. Another example of constructing a synchronization message is to prepare a message that includes information about changed state, for transmission via a protocol different than a message ordinarily handled by the messaging subsystem 101 of FIG. 1, for example a custom protocol running over TCP/IP.

An indication that the message is a synchronization message may optionally be associated with the message (2003). A synchronization indicator may be any indication identifying a particular set of one or more state changes. One example of a synchronization indicator is a synchronization token that represents a specific set of one or more state changes. In some embodiments, a synchronization token may be randomly or sequentially generated. Another example of a synchronization indicator is to use a predetermined message grouping, such as an email folder in a messaging system such as IMAP, for synchronization messages. Another example of a synchronization indicator is an indication of the creator of the synchronization message, such as an identifier or a cryptographic signature. In some embodiments, one or more synchronization indicators may be included in the message, for example in the headers of an email with a predetermined field, such as a header line "X-Synchronization-Data: XXX," wherein XXX represents a synchronization indicator, or in the subject line of an email.

The synchronization message may be sent (2004). One example of sending the synchronization message is to deliver the message into a message repository accessible to other messaging subsystems analogous to the messaging subsystem 101 of FIG. 1, such as an email inbox, sent messages folder or synchronization folder. Another example of sending the synchronization message is to transmit the message to an external server that may distribute synchronization information, for example using a predetermined addressee for a message such as an email message, or sending the message using a custom protocol over a networking protocol such as TCP/IP. Another example of sending the synchronization message is to transmit the message to a peer participating in synchronization, for example using a custom protocol over a networking protocol such as TCP/IP.

In some embodiments, a state synchronization message may be sent when messaging state has changed. In some embodiments, a state synchronization message may be sent on a predetermined schedule, for example when a predetermined period of time has elapsed, during which messaging state has changed. In some embodiments, a state synchronization message may be sent when an external event occurs.

Examples of external events that may trigger a state synchronization message include closing a messaging application, and shutting down a computer such as requesting a notebook computer to enter "sleep" mode. In some embodiments, a state synchronization message may be sent in response to a manual directive to synchronize.

Figure 21:
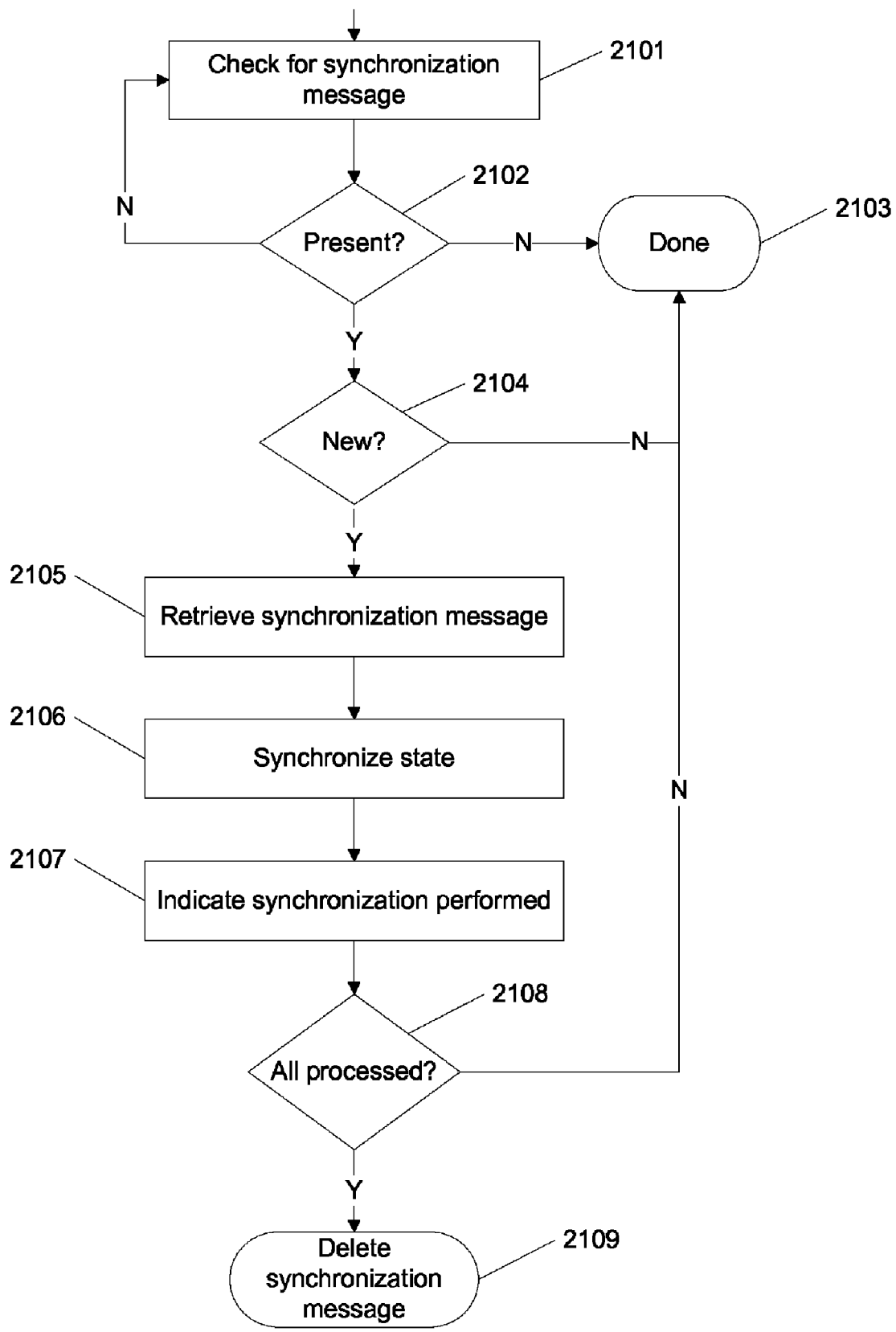
FIG. 21 is a flow diagram of a method for synchronizing messaging state, according to some embodiments.

FIG. 21 is a flow diagram of a method for synchronizing messaging state, according to some embodiments. In this example, it is determined whether there is a state synchronization message (2101). An example of determining whether there is a synchronization message is to check in a messaging repository such as an email inbox, sent messages folder or synchronization folder. In some embodiments, a synchronization message may be determined in such a repository by the presence of a synchronization indicator. Another example of determining whether there is a synchronization message is to query an external server to determine whether there is a synchronization message. Another example of determining whether there is a synchronization message is to receive a synchronization message, or an indication that there is a synchronization message, from an external server or from a peer. If no synchronization message is present (2102), then processing is complete in this example (2103).

If a synchronization message is present (2102), then it is determined in this example whether the synchronization message is new (2104). An example of a new synchronization message is a synchronization message that was not originated by the entity performing the determination, which has not yet been processed. An example of determining whether a message is not originated by the entity performing the determination is to check a synchronization indicator to determine the originating entity. An example of determining whether the synchronization message has already been processed is to determine whether there is an indication, for example in a metasynchronization message, that the entity performing the determination has processed the synchronization message. Another example of determining whether the synchronization message has already been processed is to check a stored list of processed synchronization tokens to determine whether a synchronization token associated with the synchronization message is present in the list. If it is determined that the synchronization message is not new (2104), then processing is complete in this example (2103).

If it is determined that the synchronization message is new (2104), then the synchronization message may be retrieved in this example (2105). An example of retrieving the synchronization message is to download the synchronization message from a message repository. In some embodiments, downloading the synchronization message may be done non-destructively, so the synchronization message remains in the repository. In some embodiments, for example when exactly two parties are involved in messaging state synchronization, downloading the synchronization message may be done destructively, so the synchronization message is deleted from the repository after downloading, or may later be deleted. In some embodiments, for example in systems in which non-destructive downloads are not possible, a synchronization message may be re-uploaded after downloading. Another example of retrieving the synchronization message is to receive it from an external server, for example using a custom protocol. Another example of retrieving the synchronization message is to receive it from a peer.

Messaging state may be synchronized (2106). An example of synchronizing messaging state is to apply one or more changes to messaging state indicated in the synchronization message. One example of changed messaging state is an update to address book information, such as an addition, deletion or change to an address book entry. Another example of changed messaging state is a change or addition to a whitelist. Another example of changed messaging state is a change or addition to a digital signature. Another example of changed messaging state is an update to information used to keep track of message delivery, such as return receipts or message sequence numbers. Another example of changed messaging state is a change in an attribute associated with a message, such as whether a message such as an email has been read, or responded to, or marked as requiring further action. Another example of changed messaging state is a change in the status of a message, for example deleting the message.

In some embodiments, one or more changes to messaging state indicated in the synchronization message may be applied automatically. In some embodiments, user verification may be requested, for example by presenting a user interface element such as a dialog box with an option to accept or decline one or more changes.

It may be indicated that the synchronization message has been processed (2107). One example of indicating that a synchronization message has been processed is to create and send a metasynchronization message. A metasynchronization message refers herein to any indication that an entity has processed a synchronization message. An example of a metasynchronization message is a message to an external server that the synchronization message has been processed. Another example of a metasynchronization message is a message sent into a message repository, containing an indication that the synchronization message has been processed and indicating the entity that has processed the synchronization message. Such information may be included in the message, for example in the headers of an email with a predetermined field, such as a header line "X-Synchronization-Performed: XXX," wherein XXX represents a synchronization indicator, or in the subject line of an email. In some embodiments, for example embodiments in which synchronization messages are downloaded and re-uploaded, a metasynchronization message may optionally be combined with a synchronization message.

Another example of indicating that a synchronization message has been processed is to update a list of processed synchronization messages. An example of updating a list of processed synchronization message is to store information associated with the synchronization message, such as a synchronization token, in the list.

It may be determined whether all parties performing synchronization have processed the synchronization message (2108). An example of determining whether all parties have processed a synchronization message is to evaluate one or more metasynchronization messages and determine whether all parties, or all parties except the originating party, have processed the synchronization message. In some embodiments, this determination may be made by an external server. If it is determined that all parties have processed the synchronization message (2108), then the synchronization message, and optionally one or more associated metasynchronization messages, may be deleted (2109).

In some embodiments, synchronization messages and/or metasynchronization messages may be processed automatically. In such embodiments, a synchronization message and/or metasynchronization message may be suppressed from being displayed to a user. For example, a synchronization and/or metasynchronization email may be present in a user's inbox, but may be identified, for example by the presence of a synchronization indicator, and may not be displayed when the user views his or her inbox.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for filtering an email message, comprising:
receiving an email message;
determining a non-recipient email addressee associated with the email message, wherein the non-recipient email addressee has an address that is unaffiliated with a recipient for which the email message has been received;
determining whether the non-recipient email addressee is associated with a whitelist; and
processing the email message preferentially, when it is determined that the non-recipient email addressee is associated with the whitelist.

2. The method of claim 1, wherein determining whether the non-recipient email addressee is associated with the whitelist includes calculating a hash, wherein the hash includes the non-recipient email addressee, and determining whether the hash is associated with the whitelist.

3. The method of claim 1, wherein the non-recipient email addressee is a mailing list.

4. The method of claim 1, wherein processing the email message preferentially includes delivering the email message.

5. The method of claim 1, wherein determining the non-recipient email addressee associated with the email message includes determining that the non-recipient email addressee is specified in a "To" header line in the email message.

6. The method of claim 1, wherein determining the non-recipient email addressee associated with the email message includes determining that the non-recipient email addressee is specified in a "CC" header line in the email message.

7. The method of claim 1, further comprising determining a second non-recipient email addressee associated with the email message, wherein the second non-recipient email addressee has an address that is unaffiliated with the recipient for which the email message has been received, and determining that the second non-recipient email addressee is associated with the whitelist.

8. The method of claim 1, further comprising:
receiving a second email message, wherein receiving the second email message precedes receiving the email message;
determining an email correspondent associated with the second email message, wherein the email correspondent is one of a sender of the second email message and an addressee of the second email message; and
adding the email correspondent to the whitelist.

9. The method of claim 8, further comprising determining that the second email message is not spam.

10. The method of claim 8, further comprising receiving user approval to add the email correspondent to the whitelist.

11. A system for filtering an email message, comprising:
a processor configured to:
receive an email message;
determine a non-recipient email addressee associated with the email message, wherein the non-recipient email addressee has an address that is unaffiliated with a recipient for which the email message has been received;
determine whether the non-recipient email addressee is associated with a whitelist; and
process the email message preferentially, when it is determined that the non-recipient email addressee is associated with the whitelist; and
a memory coupled with the processor, wherein the memory provides instructions to the processor.

12. The system of claim 11, wherein determining whether the non-recipient email addressee is associated with the whitelist includes calculating a hash, wherein the hash includes the non-recipient email addressee, and determining whether the hash is associated with the whitelist.

13. The system of claim 11, wherein the non-recipient email addressee is a mailing list.

14. The system of claim 11, wherein processing the email message preferentially includes delivering the email message.

15. The system of claim 11, wherein determining the non-recipient email addressee associated with the email message includes determining that the non-recipient email addressee is specified in a "To" header line in the email message.

16. The system of claim 11, wherein determining the non-recipient email addressee associated with the email message includes determining that the non-recipient email addressee is specified in a "CC" header line in the email message.

17. The system of claim 11, wherein the processor is further configured to determine a second non-recipient email addressee associated with the email message, wherein the second non-recipient email addressee has an address that is unaffiliated with the recipient for which the email message has been received, and determine that the second non-recipient email addressee is associated with the whitelist.

18. The system of claim 11, wherein the processor is further configured to:
receive a second email message, wherein receiving the second email message precedes receiving the email message;
determine an email correspondent associated with the second email message, wherein the email correspondent is one of a sender of the second email message and an addressee of the second email message; and
add the email correspondent to the whitelist.

19. The system of claim 18, wherein the processor is further configured to determine that the second email message is not spam.

20. The system of claim 18, wherein the processor is further configured to receive user approval to add the email correspondent to the whitelist.

21. A computer program product for filtering an email message, the computer program product being embodied in a non-transitory computer readable storage medium and comprising computer instructions for:
receiving an email message;
determining a non-recipient email addressee associated with the email message, wherein the non-recipient email addressee has an address that is unaffiliated with a recipient for which the email message has been received;
determining whether the non-recipient email addressee is associated with a whitelist; and
processing the email message preferentially, when it is determined that the non-recipient email addressee is associated with the whitelist.

22. The computer program product of claim 21, wherein determining whether the non-recipient email addressee is associated with the whitelist includes calculating a hash, wherein the hash includes the non-recipient email addressee, and determining whether the hash is associated with the whitelist.

23. The computer program product of claim 21, wherein the non-recipient email addressee is a mailing list.

24. The computer program product of claim 21, wherein processing the email message preferentially includes delivering the email message.

25. The computer program product of claim 21, wherein determining the non-recipient email addressee associated with the email message includes determining that the non-recipient email addressee is specified in a "To" header line in the email message.

26. The computer program product of claim 21, wherein determining the non-recipient email addressee associated with the email message includes determining that the non-recipient email addressee is specified in a "CC" header line in the email message.

27. The computer program product of claim 21, wherein the computer program product further comprises computer instructions for determining a second non-recipient email addressee associated with the email message, wherein the second non-recipient email addressee has an address that is unaffiliated with the recipient for which the email message has been received, and determining that the second non-recipient email addressee is associated with the whitelist.

28. The computer program product of claim 21, wherein the computer program product further comprises computer instructions for:
 receiving a second email message, wherein receiving the second email message precedes receiving the email message;
 determining an email correspondent associated with the second email message, wherein the email correspondent is one of a sender of the second email message and an addressee of the second email message; and
 adding the email correspondent to the whitelist.

29. The computer program product of claim 28, wherein the computer program product further comprises computer instructions for determining that the second email message is not spam.

30. The computer program product of claim 28, wherein the computer program product further comprises computer instructions for receiving user approval to add the email correspondent to the whitelist.

* * * * *